United States Patent
Yang et al.

(10) Patent No.: US 10,034,151 B2
(45) Date of Patent: Jul. 24, 2018

(54) METHOD FOR PROVIDING POINT OF INTEREST AND ELECTRONIC DEVICE THEREOF

(71) Applicant: Samsung Electronics Co., Ltd., Gyeonggi-do (KR)

(72) Inventors: Jong-Eun Yang, Seoul (KR); Young-Hoon Kim, Gyeonggi-do (KR); Hyun-Joong Kim, Gyeonggi-do (KR); Jin-Ho Moon, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 14/963,091

(22) Filed: Dec. 8, 2015

(65) Prior Publication Data
US 2016/0165417 A1   Jun. 9, 2016

(30) Foreign Application Priority Data
Dec. 8, 2014   (KR) ........................ 10-2014-0175037

(51) Int. Cl.
*H04W 4/14*   (2009.01)
*H04W 4/20*   (2018.01)
*G06Q 20/32*   (2012.01)
*G06F 17/30*   (2006.01)

(52) U.S. Cl.
CPC ........ *H04W 4/14* (2013.01); *G06F 17/30964* (2013.01); *G06Q 20/3255* (2013.01); *H04W 4/203* (2013.01)

(58) Field of Classification Search
CPC ............ G06F 17/30; G06F 1/32; H04W 4/14
See application file for complete search history.

(56) References Cited

U.S. PATENT DOCUMENTS

| | | | |
|---|---|---|---|
| 2009/0098854 A1* | 4/2009 | Park | G06Q 20/14 455/407 |
| 2009/0282343 A1 | 11/2009 | Catlin et al. | |
| 2011/0154078 A1* | 6/2011 | Nrusimhan N.V. | G06F 1/3212 713/323 |
| 2011/0171968 A1 | 7/2011 | Hyun et al. | |

(Continued)

FOREIGN PATENT DOCUMENTS

| KR | 10-2007-0009771 A | 1/2007 |
|---|---|---|
| KR | 10-2011-0083177 A | 7/2011 |

(Continued)

OTHER PUBLICATIONS

Extended European Search Report dated Mar. 29, 2016 in connection with European Patent Application No. 15198390.5; 7 pages.

(Continued)

*Primary Examiner* — Myron K Wyche

(57) ABSTRACT

A method of providing Point Of Interest (POI) information in an electronic device may include receiving information on an event, analyzing a text included in the information on the event and a location at which the information on the event is received, and controlling a display to display POI information based in part on a result of the analysis. According to various embodiments of the present disclosure, the method of providing the POI information in the electronic device may be implemented by the electronic device.

30 Claims, 16 Drawing Sheets

(56) References Cited

U.S. PATENT DOCUMENTS

2012/0185381 A1    7/2012  Kim
2013/0046738 A1*  2/2013  Kuo .................. G01C 21/3682
                                                                      707/690

FOREIGN PATENT DOCUMENTS

KR    10-2012-0082561 A    7/2012
KR    10-2013-0124612 A   11/2013

OTHER PUBLICATIONS

James R. Johnson, et al., "Expaneed Semanticv Graph Representation for Matching Related Information of Interest Accross Free Text Documents", 2012 IEEE Sixth International Conference on Semantic Computing, Sep. 19, 2012, pp. 60-66.

* cited by examiner

FIG.16A
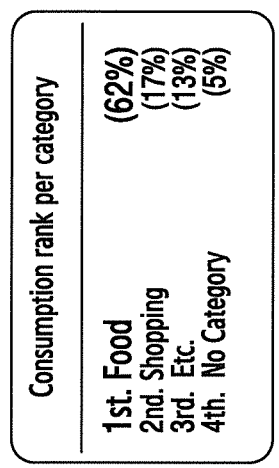
FIG.16B
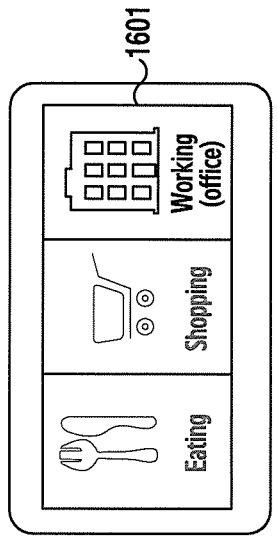
FIG.16C
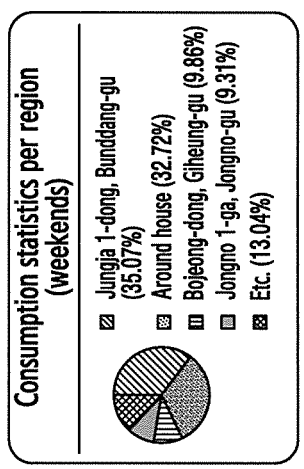
FIG.16D
FIG.16E

METHOD FOR PROVIDING POINT OF INTEREST AND ELECTRONIC DEVICE THEREOF

CROSS-REFERENCE TO RELATED APPLICATIONS AND CLAIM OF PRIORITY

The present application is related to and claims benefit under 35 U.S.C. § 119(a) of a Korean patent application filed in the Korean Intellectual Property Office on Dec. 8, 2014 and assigned Serial No. 10-2014-0175037, the entire disclosure of which is hereby incorporated by reference.

TECHNICAL FIELD

The present disclosure relates to a method for providing Point Of Interest (POI) information and an electronic device thereof.

BACKGROUND

The number of electronic devices for performing one or more functions in a complex manner has increased in recent years. Further, a mobile terminal which is represented as so-called a 'smart phone' is generally used as the electronic devices. An electronic device such as a mobile terminal has a touch-type display module with a large-sized screen, and has a high-definition camera module to capture a still picture and a moving picture, in addition to a typical function such as communication with an opposite party, and can access a network to perform web surfing. Such an electronic device is gradually evolved to employ a highly effective processor, thereby being able to perform various functions.

SUMMARY

To address the above-discussed deficiencies, it is a primary object to provide a method and apparatus for providing Point Of Interest (POI) information on an event (e.g., a financial settlement) generated in an electronic device.

According to various embodiments, there may be provided a method and apparatus for receiving POI information on an event (e.g., a financial settlement) generated in an electronic device from a server.

According to various embodiments, an electronic device may include a display, and a processor for receiving information on an event, for analyzing a text included in the information on the event and a location at which the information on the event is received, and for controlling the display to display POI information based on a result of the analysis.

According to various embodiments, an electronic device may include a processor for receiving a POI information request for an event from an external electronic device, for determining POI information based on information on the event and received from the external electronic device, and for transmitting the determined POI information to the external electronic device.

According to various embodiments, a method of providing POI information in an electronic device may include receiving information on an event, analyzing a text included in the information on the event and a location at which the information on the event is received, and controlling the display to display the POI information based on a result of the analysis.

According to various embodiments, a method of providing POI information in an electronic device may include receiving a POI information request for an event from an external electronic device, determining POI information based on information on the event and received from the external electronic device, and transmitting the determined POI information to the external electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following detailed description taken in conjunction with the accompanying drawings, in which: For a more complete understanding of the present disclosure and its advantages, reference is now made to the following description taken in conjunction with the accompanying drawings, in which like reference numerals represent like parts:

FIGS. 16A through 16E (together referred to as FIG. 16) illustrates a screen configuration for modifying a consumption type on the basis of financial settlement information in an electronic device according to various embodiments of the present disclosure.

DETAILED DESCRIPTION

Figure 1:
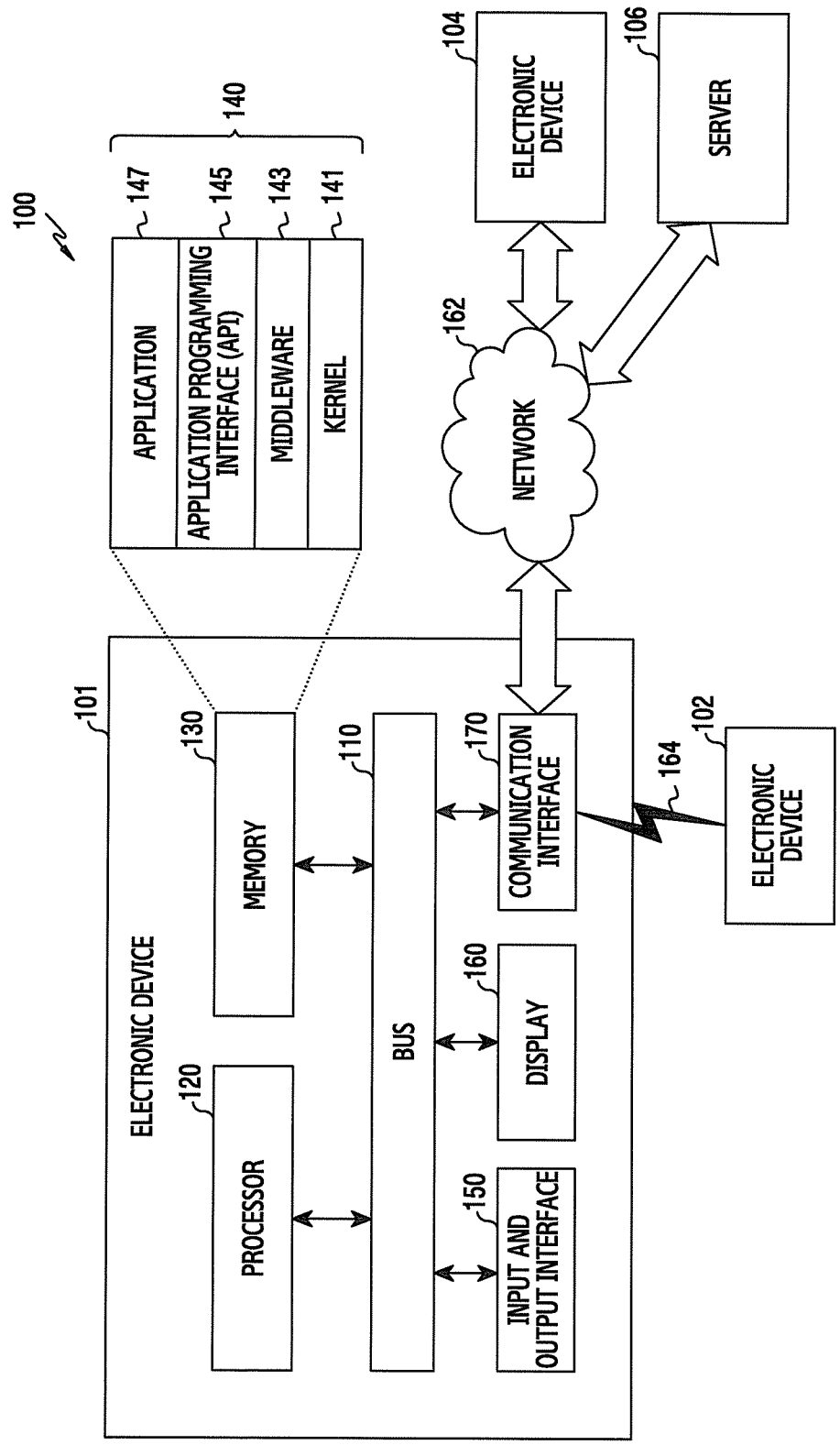
FIG. 1 illustrates a network environment including an electronic device according to various embodiments of the present disclosure.

FIGS. 1 through 16E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Embodiments of the present disclosure are described in detail with reference to the accompanying drawings. The same or similar components may be designated by the same or similar reference numerals although they are illustrated in different drawings. Detailed descriptions or constructions or processes known in the art may be omitted to avoid obscuring the subject matter of the present disclosure.

The terms "have," "may have," "include," and "may include", as used herein, indicate the presence of corresponding features (for example, elements such as numerical values, functions, operations, or parts), and do not preclude the presence of additional features.

The terms "A or B," "at least one of A and B," or "one or more of A and B", as used herein, include all possible combinations of items enumerated with them. For example, "A or B," "at least one of A and B," or "one or more of A and B" means (1) including at least one A, (2) including at least one B, or (3) including both at least one A and at least one B.

The terms such as "first" and "second", as used herein, may modify various elements regardless of an order and/or importance of the corresponding elements, and does not limit the corresponding elements. These terms may be used for the purpose of distinguishing one element from another element. For example, a first user device and a second user device may indicate different user devices regardless of their order or importance. For example, a first element may be referred to as a second element without departing from the scope of embodiments of the present disclosure, and similarly, a second element may be referred to as a first element.

It will be understood that, when an element (for example, a first element) is "(operatively or communicatively) coupled with/to" or "connected to" another element (for example, a second element), the first element may be directly coupled with/to the second element, or there may be an intervening element (for example, a third element) between the first element and the second element. To the contrary, it will be understood that, when an element (for example, the first element) is "directly coupled with/to" or "directly connected to" another element (for example, the second element), there is no intervening element (for example, the third element) between the first element and the second element.

The expression "configured to (or set to)", as used herein, may be replaced with "suitable for," "having the capacity to," "designed to," "adapted to," "made to," or "capable of", according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in the various embodiments of the present disclosure are just for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined in the various embodiments. According to circumstances, even terms defined in the embodiments should not be interpreted as excluding other embodiments of the present disclosure.

An electronic device, according to various embodiments of the present disclosure, may include at least one of a smartphone, a tablet Personal Computer (PC), a mobile phone, a video phone, an electronic book reader, a desktop PC, a laptop PC, a netbook computer, a workstation, a server, a Personal Digital Assistant (PDA), a Portable Multimedia Player (PMP), an MP3 player, a mobile medical machine, a camera, or a wearable device (for example, smart glasses, a Head Mounted Device (HMD), electronic clothing, an electronic bracelet, an electronic necklace, an electronic appcessory, electronic tattoos, a smart mirror, or a smart watch).

According to embodiments of the present disclosure, the electronic device may be a smart home appliance. For example, the smart home appliance may include at least one of a television, a Digital Versatile Disc (DVD) player, a stereo, a refrigerator, an air conditioner, a cleaner, an oven, a microwave oven, a washing machine, an air cleaner, a set-top box, a home automation control panel, a security control panel, a TV box, a game console, an electronic dictionary, an electronic key, a camcorder, or an electronic album.

According to another embodiment, the electronic device may include at least one of various medical machines (for example, various portable medical measurement devices (a glucose monitor, a heart rate monitor, a blood pressure measuring device, or a thermometer), Magnetic Resonance Angiography (MRA), Magnetic Resonance Imaging (MRI), Computerized Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example, a navigation equipment for ship, a gyro compass, and the like), avionics, a security device, a head unit for vehicles, an industrial or home robot, an Automated Teller Machine (ATM) of a financial institution, Point of Sales (POS) device of a store, or Internet of Things (IoT) (for example, a lamp, various sensors, an electric or gas meter, a sprinkler, a fire alarm, a thermostat, a streetlamp, a toaster, an exercising machine, a hot water tank, a heater, a boiler, etc.).

According to an embodiment, the electronic device may include at least one of a part of furniture or a building/a structure, an electronic board, an electronic signature-receiving device, a projector, and various measurement devices (for example, devices for measuring water, power, gas, radio waves, and the like). The electronic device, according to various embodiments, may be one or a combination of one or more of the above-described devices. In addition, the electronic device, according to various embodiments, may be a flexible electronic device. In addition, the electronic device, according to various embodiments, is not limited to the above-described devices, and may include a new electronic device accompanied by technology development.

The term "user", as used herein, may refer to a person who uses the electronic device or a device that uses the electronic device (for example, an artificial intelligence electronic device).

FIG. 1 is a diagram illustrating a network environment including an electronic device, according to an embodiment of the present disclosure.

Referring to FIG. 1, an electronic device 101 in a network environment 100 is described. The electronic device 101 includes a bus 110, a processor 120, a memory 130, an input and output interface 150, a display 160, and a communication interface 170. According to an embodiment, the electronic device 101 may omit at least one of the elements or may include additional elements.

The bus 110 may include a circuit that connects the elements 110-170 with one another and transmits communication (for example, a control message and/or data) between the elements.

The processor 120 may include one or more of a Central Processing Unit (CPU), an Application Processor (AP), or a Communication Processor (CP). The processor 120 may execute calculation or data processing related to control and/or communication of at least one other element of the electronic device 101.

According to an embodiment, the processor 120 may selectively output contents related to a service through an output device (e.g., the display 160 and the like) based on an activation or deactivation of the service corresponding to a wireless signal received through the communication interface 170. For example, the processor 120 may identify the activation or deactivation of the service based on at least one of an identifier, a search filter, a server address of a service included in the received wireless signal or corresponding to the received wireless signal through the communication interface 170. For example, the processor 120 may output the contents related to the service based on at least one of a capability of a user of the electronic device 101, information on whether the electronic device is moved or fixed or a mobility of the electronic device, and an operation mode of the electronic device 101. The capability of the user of the electronic device 101 may include at least one of a language configured in the electronic device 101, a disability or ability of the user, and an age of the user.

In addition, the operation mode of the electronic device 101 may include at least one of a driving mode, a meeting mode, a movie watching mode, a call mode, and a sleep mode configured in the electronic device 101.

According to an embodiment, when a corresponding service is activated, the processor 120 may receive content (e.g., music content, image content, a coupon, and the like) related to the corresponding service. For example, when the service is activated, the processor 120 may extract the content related to the service in the wireless signal received through the communication interface 170.

In addition, when the service is activated, the processor 120 may obtain the content related to the corresponding service from a server 106. For example, the processor 120 may transmit a transmission request signal of the content related to the service to the server 106 through the communication interface 170.

According to an embodiment, when the service is activated, the processor 120 may control the output device (e.g., the display 160 and the like), such that the output device generates at least one of a vibration, a sound, and a screen turning on, corresponding to the activation of the service.

According to an embodiment, when the service is not activated, the processor 120 may control the output device, such that the output device outputs information for determining whether the service is activated. The information for determining whether the service is activated may include at least one of a menu, an icon, and a pop-up.

According to an embodiment, when a sharing event for the contents related to the service output through the output device is generated, the processor 120 may control the communication interface 170, such that the communication interface 170 transmits the contents to at least one external electronic device (e.g., the first external electronic device 102 or the second external electronic device 104).

The memory 130 may include a volatile and/or non-volatile memory. For example, the memory 130 may store instructions or data, which is related to at least one other element of the electronic device 101. According to an embodiment, the memory 130 may store software and/or a program 140. For example, the program 140 includes at least one of a kernel 141, middleware 143, an Application Programming Interface (API) 145, and an application program (or an application) 147. At least some of the kernel 141, the middleware 143, or the API 145 may be referred to as an Operating System (OS).

For example, the kernel 141 may control or manage system resources (for example, the bus 110, the processor 120, the memory 130, and the like), which are used for performing operations or functions implemented in the other programs (for example, the middleware 143, the API 145, or the application 147).

In addition, the kernel 141 may provide an interface for allowing the middleware 143, the API 145, or the application program 147 to access an individual element of the electronic device 101 and control or manage the system resources.

For example, the middleware 143 may serve as an intermediary to allow the API 145 or the application program 147 to communicate with the kernel 141 and exchange data with the kernel 141.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

For example, the API 145 may be an interface for allowing the application 147 to control a function provided by the kernel 141 or the middleware 143, and, for example, may include at least one interface or function (for example, instructions) for controlling a file, controlling a window, processing an image, or controlling a text.

For example, the input and output interface 150 may serve as an interface for transmitting instructions or data inputted from a user or another external device to other element(s) of the electronic device 101. In addition, the input and output interface 150 may output instructions or data received from other element(s) of the electronic device 101 to the user or the other external device.

For example, the display 160 may include a Liquid Crystal Display (LCD), a Light Emitting Diode (LED) display, an Organic LED (OLED) display, or a MicroElectroMechanical System (MEMS) display, or an electronic paper display. The display 160 may display various pieces of content (for example, text, an image, a video, an icon, a symbol, etc.) for the user. The display 160 may include a touch screen, and for example, may receive input of a touch using an electronic pen or a part of a user's body, a gesture, approach, or hovering.

According to an embodiment, the display 160 may output the contents related to the corresponding service based on the activation or deactivation of the service corresponding to the received wireless signal. According to an embodiment, when the service is activated, the display 160 may generate at least one of a vibration, a sound and a screen turning on corresponding to the content related to the service. According to an embodiment, when the service is not activated, the display 160 may output the information (e.g., the menu, the icon, the pop-up and the like) for determining whether the service is activated.

For example, the communication interface 170 may establish communication between the electronic device 101 and a first external electronic device 102, a second external electronic device 104, or the server 106. For example, the communication interface 170 may be connected to a network 162 via wireless communication or wire communication to communicate with the second external electronic device 104, or the server 106.

The wireless communication may use, as a cellular communication protocol, at least one of Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM), etc. In addition, for example, the wireless communication may include short-distance communication 164. For example, the short-distance communication 164 may include at least one of Wireless Fidelity (WiFi), Bluetooth, Near Field Communication (NFC), GPS, etc. The wire communication may include at least one of a Universal Serial Bus (USB), a High Definition Multimedia Interface (HDMI), a Recommended Standard 232 (RS-232), or Plain Old Telephone Service (POTS). The network 162 may include a telecommunications network, for example, at least one of a computer network (for example, a LAN or WAN), Internet, or a telephone network.

Each of the first external electronic device 102 and the second external electronic device 104 may be the same type of electronic device as the electronic device 101 or a different kind of device. According to an embodiment, the server 106 may include a group of one or more servers. According to various embodiments, all or a part of the operations executed in the electronic device 101 may be executed in another electronic device or a plurality of other electronic devices (for example, the first or second external electronic devices 102, 104 or the server 106). According to an embodiment, when the electronic device 101 should perform a certain function or service automatically or in response to a request, the electronic device 101 may request another external electronic device 102, 104 or the server 106 to perform at least some function related to the certain function or service additionally or instead of executing the function or service by itself. Another external electronic device 102, 104 or the server 106 may execute the requested function or additional function, and transmit the result to the electronic device 101. The electronic device 101 may process the received result as it is or additionally, and provide the requested function or service. To achieve this, cloud computing, distributed computing, or client-server computing technology may be used, for example.

Figure 2:
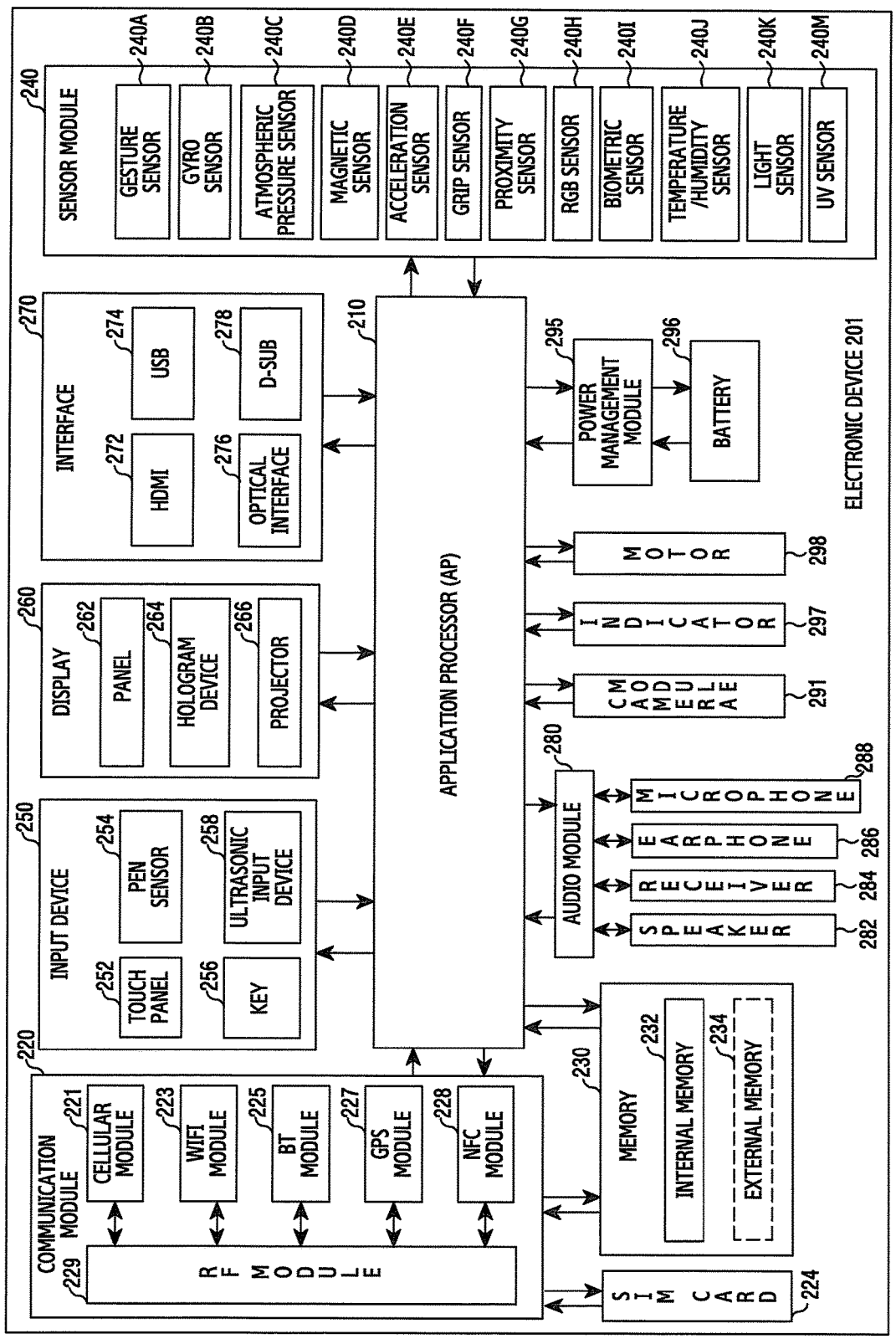
FIG. 2 illustrates a block diagram of an electronic device according to various embodiments of the present disclosure.

FIG. 2 is a diagram illustrating a block diagram of an electronic device, according to an embodiment of the present disclosure. For example, an electronic device 201 may include an entirety or a part of the electronic device 101 shown in FIG. 1.

Referring to FIG. 2, the electronic device 201 includes one or more processors 210 (for example, an AP), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an operating system or an application program, and may process and calculate various data. For example, the processor 210 may be implemented by using a System on Chip (SoC). According to an embodiment, the processor 210 may further include a Graphic Processing Unit (GPU) and/or an image signal processor. The processor 210 may include at least part of the elements shown in FIG. 2 (for example, a cellular module 221). The processor 210 may load instructions or data received from at least one of the other elements (for example, a non-volatile memory) into a volatile memory and process the instructions or data, and may store various data in the non-volatile memory.

The communication module 220 may have a same or similar configuration as that of the communication interface 170 of FIG. 1. For example, the communication module 220 includes at least one of the cellular module 221, a WiFi module 223, a BT module 225, a GPS module 227, an NFC module 228, and a Radio Frequency (RF) module 229.

The cellular module 221 may provide a voice call, a video call, a text service, or an internet service through a telecommunications network. According to an embodiment, the cellular module 221 may identify and authenticate the electronic device 201 in the telecommunications network by using the subscriber identification module 224. According to an embodiment, the cellular module 221 may perform at least some of the functions provided by the processor 210.

According to an embodiment, the cellular module 221 may include a communication processor (CP).

The WiFi module 223, the BT module 225, the GPS module 227, or the NFC module 228 each may include a processor for processing data received and transmitted through a corresponding module. According to an embodiment, at least some (for example, two or more) of the cellular module 221, the WiFi module 223, the BT module 225, the GPS module 227, or the NFC module 228 may be included in a single Integrated Chip (IC) or a single IC package.

The RF module 229 may transmit and receive communication signals (for example, an RF signal). For example, the RF module 229 may include a transceiver, a Power Amp Module (PAM), a frequency filter, a Low Noise Amplifier (LNA), an antenna, etc. According to another embodiment, at least one of the cellular module 221, the WiFi module 223, the BT module 225, the GPS module 227, or the NFC module 228 may transmit and receive an RF signal through a separate RF module.

The subscriber identification module 224 may include a card and/or an embedded SIM, and may include its unique identification information (for example, an Integrated Circuit Card Identifier (ICCID)) or subscriber information (for example, International Mobile Subscriber Identity (IMSI)).

The memory 230 (for example, the memory 130) includes at least one of an internal memory 232 or an external memory 234. For example, the internal memory 232 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a flash memory (for example, a NAND flash memory, a NOR flash memory, and the like), a hard drive, a solid state drive (SSD).

The external memory 234 may further include a flash drive, for example, Compact Flash (CF), Secure Digital (SD), Micro-SD, Mini-SD, extreme-Digital (xD), a Multi Media Card (MMC), memory stick, and the like. The external memory 234 may be functionally and/or physically connected with the electronic device 201 through various interfaces.

The sensor module 240 may measure a physical quantity or detect an operation state of the electronic device 201, and may convert measured or detected information into electric signals. The sensor module 240 includes at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., Red, Green, Blue (RGB) sensor), a biosensor 240I, a temperature/humidity sensor 240J, an illumination sensor 240K, and a Ultraviolet (UV) sensor 240M. Additionally or alternatively, the sensor module 240 may include an E-nose sensor, an ElectroMyoGraphy (EMG) sensor, an ElectroEncephaloGram (EEG) sensor, an ElectroCardioGram (ECG) sensor, an InfraRed ray (IR) sensor, an iris sensor, and/or a fingerprint sensor, and the like. The sensor module 240 may further include a control circuit to control at least one sensor included therein. According to an embodiment, the electronic device 201 may further include a processor configured to control the sensor module 240 as a part of the processor 210 or a separate part, and may control the sensor module 240 while the processor 210 is in a sleep state.

The input device 250 includes at least one of a touch panel 252, a (digital) pen sensor 254, a key 256, and an ultrasonic input device 258. The touch panel 252 may use at least one method of capacitive, resistive, infrared, and ultrasonic methods. In addition, the touch panel 252 may further include a control circuit. The touch panel 252 may further include a tactile layer to provide a tactile response to the user.

The (digital) pen sensor 254 may be a part of the touch panel or may include a separate detection sheet. The key 256 may include a physical button, an optical key, or a keypad. The ultrasonic input device 258 may detect ultrasonic waves generated in an input tool through a microphone 288, and identify data corresponding to the detected ultrasonic waves.

The display 260 (e.g., the display 160) includes at least one of a panel 262, a hologram device 264, or a projector 266. The panel 262 may have a same or similar configuration as or to that of the display 160 of FIG. 1. For example, the panel 262 may be implemented to be flexible, transparent, or wearable. The panel 262 may be configured as a single module along with the touch panel 252. The hologram device 264 may show a stereoscopic image in the air using interference of light. The projector 266 may display an image by projecting light onto a screen. The screen may be located inside or outside the electronic device 201. According to an embodiment, the display 260 may further include a control circuit to control the panel 262, the hologram device 264, or the projector 266.

The interface 270 includes at least one of an HDMI 272, a USB 274, an optical interface 276, or D-subminiature (sub) 278. The interface 270 may be included in the communication interface 170 shown in FIG. 1. Additionally or alternatively, the interface 270 may include an MHL interface, an SD card/Multimedia Card (MMC) interface or Infrared Data Association (IrDA) standard interface.

The audio module 280 may convert a sound and an electric signal bidirectionally. For example, at least some elements of the audio module 280 may be included in the input and output interface 150 shown in FIG. 1. The audio module 280 may process sound information that is input or output through a speaker 282, a receiver 284, an earphone 286, or a microphone 288.

The camera module 291 is a device for photographing a still image and a moving image, and, according to certain embodiments of the present disclosure, the camera module 291 may include one or more image sensors (for example, a front surface sensor or a rear surface sensor), a lens, an Image Signal Processor (ISP), or a flash (for example, a Light Emitting Diode (LED) or a xenon lamp).

The power management module 295 may manage power of the electronic device 201. According to an embodiment, the power management module 295 may include a Power Management IC (PMIC), a charger IC, or a battery gauge. For example, the PMIC may have a wire charging method and/or a wireless charging method. The wireless charging method may include a magnetic resonance method, a magnetic induction method, or an electromagnetic wave method, and an additional circuit for charging wirelessly, for example, a coil loop, a resonant circuit, a rectifier, and the like may be added. For example, the battery gage may measure a remaining battery life of the battery 296, a voltage, a current, or temperature during charging. The battery 296 may include a rechargeable battery and/or a solar battery.

The indicator 297 may display a specific state of the electronic device 201 or a part of it (for example, the processor 210), for example, a booting state, a message state, or a charging state. The motor 298 may convert an electric signal into a mechanical vibration, and cause a vibration or haptic effect. The electronic device 201 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device, according to various embodiments of the present disclosure, may include one or more components, and the names of the elements may vary according to the kind of the electronic device. The electronic device, according to various embodiments, may include at least one of the above-described elements, and some of the elements may be omitted or an additional element may be further included. In addition, some of the elements of the electronic device, according to various embodiments, may be combined into a single entity, and may perform the same functions as those of the elements before being combined.

Figure 3:
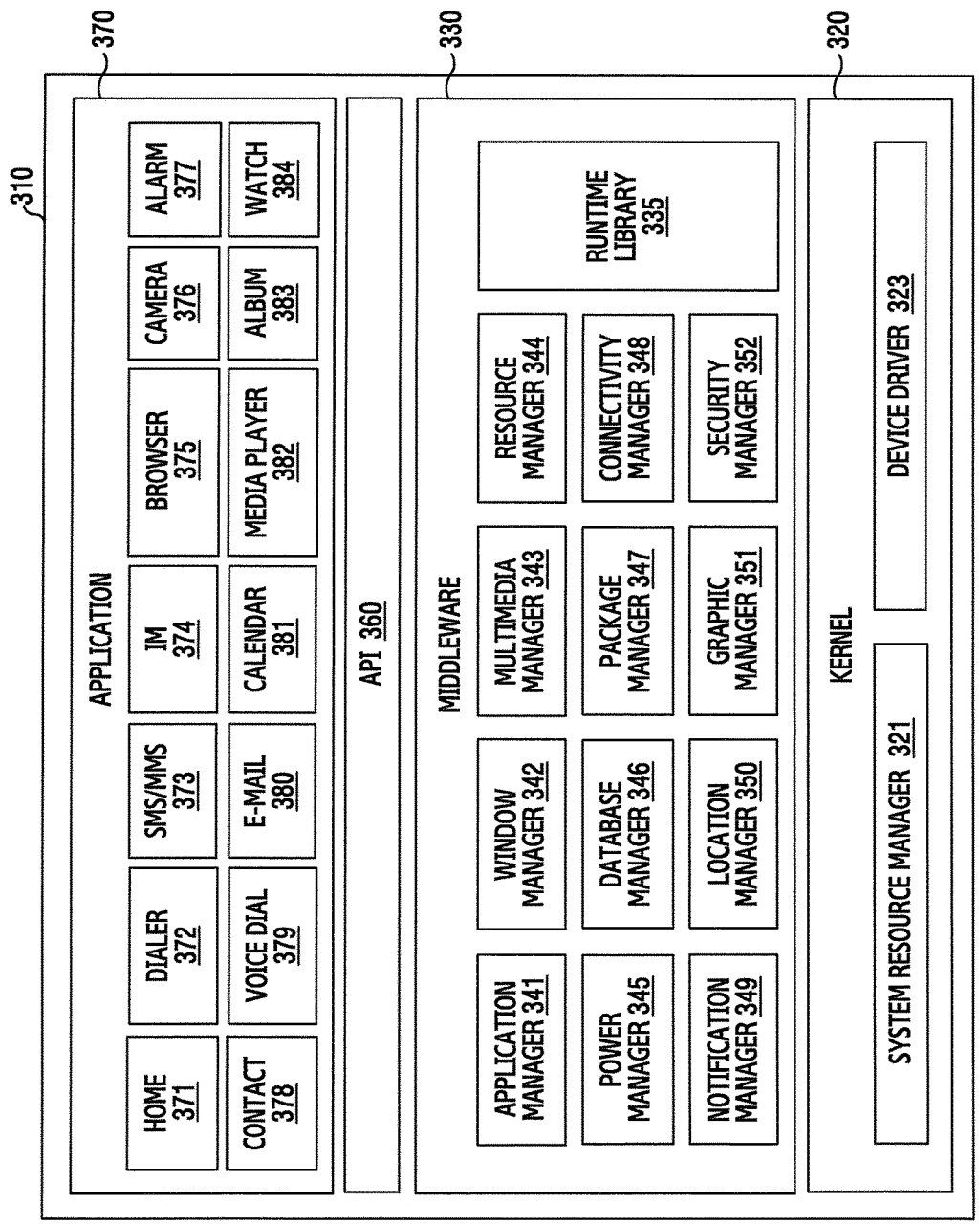
FIG. 3 illustrates a block diagram of a program module according to various embodiments of the present disclosure.

FIG. 3 is a block diagram illustrating a program module, according to an embodiment of the present disclosure. According to an embodiment, a program module 310 (for example, the program 140) may include an Operating System (OS) for controlling resources related to an electronic device 101 and/or various applications 147 driven on the OS.

Referring to FIG. 3, the program module 310 includes a kernel 320, middleware 330, an Application Programming Interface (API) 360, and/or an application 370. At least part of the program module 310 may be preloaded on the electronic device or downloaded from an external device 102, 104, the server 106, or the like.

The kernel 320 (for example, the kernel 141) includes a system resource manager 321 and/or a device driver 323. The system resource manager 321 may control, allocate or collect the system resources. According to an embodiment, the system resource manager 321 may include a process manager, a memory manager, a file system manager, and the like. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver, for example.

The middleware 330 may provide functions that are commonly required by the application 370 or may provide various functions to the application 370 through the API 360 such that the application 370 can effectively use limited system resources in the electronic device. According to an embodiment, the middleware 330 (for example, the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

For example, the runtime library 335 may include a library module that is used by a compiler to add a new function through a programming language while the application 370 is executed. The runtime library 335 may perform functions on input/output management, memory management, an arithmetic function, and the like.

The application manager 341 may manage a life cycle of at least one of the applications 370, for example. The window manager 342 may manage GUI resources used in a screen. The multimedia manager 343 grasps a format necessary for reproducing various media files and encodes or decodes the media files by using a Codec suited to the corresponding format. The resource manager 344 may manage resources such as a source code, a memory, or a storage space of at least one of the applications 370.

The power manager 345 operates along with a Basic Input/Output System (BIOS) to manage a battery or power and provide power information necessary for operations of the electronic device. The database manager 346 may generate, search, or change a database, which is used in at least one of the applications 370. The package manager 347 may manage installing or updating an application that is distributed in the form of a package file.

The connectivity manager 348 may manage wireless connection of WiFi, Bluetooth, and the like. The notification manager 349 may display or notify an event, such as a message arrived, an appointment, a notification of proximity, in such a manner that the event does not hinder the user. The location manager 350 may manage location information of the electronic device. The graphic manager 350 may manage a graphic effect to be provided to the user or a relevant user interface. The security manager 352 may provide an overall security function necessary for system security or user authentication. According to an embodiment, when the electronic device 101 is equipped with a telephony function, the middleware 330 may further include a telephony manager to manage a speech or video telephony function of the electronic device.

The middleware 330 may include a middleware module to form a combination of the various functions of the above-described elements. The middleware 330 may provide a module that is customized according to a kind of OS to provide a distinct function. In addition, the middleware 330 may dynamically delete some of the existing elements or may add new elements.

The API 360 (for example, the API 145) is a set of API programming functions and may be provided as a different configuration according to an OS. For example, a single API set may be provided for each platform, or two or more API sets may be provided for each platform.

The application 370 includes one or more applications for providing functions, such as, for example, a home 371, a dialer 372, a Short Message Service (SMS)/Multimedia Messaging Service (MMS) 373, an Instant Message (IM) 374, a browser 375, a camera 376, an alarm 377, contacts 378, a voice dial 379, an email 380, a calendar 381, a media player 382, an album 383, or a clock 384, or health care (for example, measuring exercise or a blood sugar level), or providing environment information (for example, information on atmospheric pressure, humidity, or temperature).

According to an embodiment of the present disclosure, the applications 370 may include an application (hereinafter, an "information exchange application") supporting information exchange between the electronic device 101 and an external electronic device 102 or 104. The information exchanged application may include, for example, a notification relay application for transferring specific information to the external electronic device or a device management application for managing the external electronic device.

For example, the notification relay application may include a function of transferring, to the external electronic device 102 or 104, notification information generated from other applications (for example, an SMS/MMS application, an e-mail application, a health management application, or an environmental information application) of the electronic device. Further, the notification relay application may receive notification information from, for example, the external electronic device and provide the received notification information to a user. For example, the device management application may manage (for example, install, delete, or update) at least one function (for example, a function of turning on/off the external electronic device itself (or some components) or a function of adjusting luminance (or a resolution) of the display), applications operating in the external electronic device, or services provided by the external electronic device (for example, a call service and a message service) of the external electronic device 104 communicating with the electronic device.

According to an embodiment, the applications 370 may include an application (for example, health management application) designated according to attributes (for example, attributes of the electronic device such as the type of electronic device which corresponds to a mobile medical device) of the external electronic device 102 or 104. According to an embodiment, the application 370 may include an application received from the external electronic device (e.g., the server 106, or the first or second external electronic device 102 or 104). According to an embodiment, the application 370 may include a preloaded application or a third party application, which can be downloaded from the server. Names of the elements of the program module 310, according to the above-described embodiment, may change depending on the type of OS.

According to various embodiments, at least some of the program module 310 may be implemented in software, firmware, hardware, or a combination of two or more thereof. At least some of the program module 310 may be implemented (e.g., executed) by, for example, the processor (e.g., the AP 210). At least some of the program module 310 may include, for example, a module, a program, a routine, a set of instructions, or a process for performing one or more functions.

According to various embodiments of the present disclosure, an electronic device may include a display, and a processor for receiving information on an event, for analyzing a text included in the information on the event and a location at which the information on the event is received, and for controlling the display to display Point Of Interest (POI) information based on a result of the analysis.

According to various embodiments of the present disclosure, the processor may confirms whether the received SMS includes a pre-defined card company's name or phone number upon receiving an SMS, and if the received SMS includes the pre-defined card company's name or phone number, may analyze the text included in the received SMS and the location at which the information is received.

According to various embodiments of the present disclosure, the processor may confirm a location at which the information on the event is received through a Global Positioning System (GPS) sensor or a network.

According to various embodiments of the present disclosure, the processor may extract a company name from the text included in the financial settlement information, and may detect a company name similar to the company name corresponding to a location within a radius of a reference distance on the basis of a location at which the financial settlement information is received.

According to various embodiments of the present disclosure, the processor may analyze the text included in the financial settlement information and a reception location, and thus may request an external electronic device to transmit the POI information based on a result of the analysis.

According to various embodiments of the present disclosure, the processor may control the display to receive the POI information based on the result of the analysis from an external electronic device and to display the POI information.

According to various embodiments of the present disclosure, the processor may receive a feedback request for the POI information from an external electronic device, may control the display to display a user interface for responding to the feedback request for the POI information, and may transmit to the external electronic device a feedback for the POI information based on a user's selection for the user interface.

According to various embodiments of the present disclosure, the electronic device may receive a POI information request for financial settlement information from an external electronic device, may determine POI information based on information received from the external electronic device, and may transmit the determined POI information to the external electronic device.

According to various embodiments of the present disclosure, the processor may extract a location at which the financial settlement information is received and a company name included in the financial settlement information from the information received from the external electronic device, and may determine a company name similar to the company name corresponding to a location within a reference radius as the POI information of the financial settlement information on the basis of the location at which the financial settlement information is received.

According to various embodiments of the present disclosure, if the similar company name exists in the plural, the processor may determine a company name corresponding to a location closest in distance to a location at which the financial settlement information is received as the POI information of the financial settlement information.

According to various embodiments of the present disclosure, the processor may request a feedback for the POI information transmitted to the external electronic device, and may receive the feedback for the POI information from the external electronic device.

Figure 4:
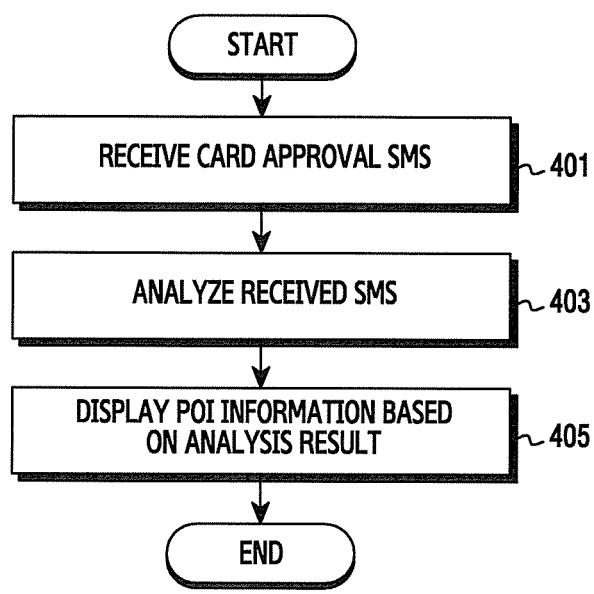
FIG. 4 illustrates a procedure for providing Point of Interest (POI) information on an event generated in an electronic device according to various embodiments of the present disclosure.

FIG. 4 illustrates a procedure for providing POI information on an event generated in an electronic device according to various embodiments of the present disclosure.

Referring to FIG. 4, in operation 401, the electronic device may detect the generation of the event (e.g., a financial settlement). According to certain embodiments of the present disclosure, in the detecting (or confirming) of financial settlement information, the electronic device may receive a message using a protocol (e.g., a Short Message Service (SMS)) including at least one text, and may confirm whether the received message includes information associated with the financial settlement (hereinafter, 'financial settlement information'). For example, upon receiving the message (e.g., the SMS), the electronic device may determine whether the received SMS includes the financial settlement information. For example, as a method of detecting the financial settlement information, the electronic device may determine whether the received SMS includes a specific phone number (e.g., a phone number or a key number of a specific financial institute), and/or may confirm whether information regarding 'approval' of a specific settlement means (e.g., a card settlement) is included in content of the SMS. Herein, the specific financial institute may be various institutes such as a financial institution for providing a settlement service (e.g., a stock firm, a bank), an insurance company, and a shop. Herein, a location at which the financial settlement is processed according to the aforementioned description or a name of the institution may be defined as a settlement approval location. In addition, the electronic device may detect a card approval SMS (or a settlement approval SMS) by filtering an advertisement, a wire transfer, an approval cancellation, other notifications, etc., received from the specific card company among SMSs to be received. In the following description, the SMS received by the electronic device may be an SMS for receiving information regarding various financial settlements (e.g., a settlement approval or a financial process). According to certain embodiments of the present disclosure, the electronic device may receive an SMS for a financial task processed in a bank or a stock firm. For example, the electronic device may receive information regarding a process of various tasks such as deposit/withdrawal, wire transfer, payment (e.g., tax payment), issuance (e.g., new account issuance, card issuance), closure (e.g., account closure), and settlement processed in a back at a specific location by using the SMS. In addition, the electronic device may receive information regarding a process of financial tasks such as stock trading, settlement, and regular withdrawal processed in a stock firm or an insurance company at a specific location by using the SMS. The electronic device may receive information regarding a designated financial transaction task of a user such as the aforementioned approval of the card settlement and a task processed in a financial institute (e.g., a bank, a stock firm) by using the SMS. In addition, the electronic device may receive the financial settlement information by including the SMS through various messages. For example, the electronic device may receive a financial settlement service through various types of message services such as a Long Message Service (LMS) and a Multi Message Service (MMS). In addition, the message may include a link to a specific page (e.g., an Internet page).

Figure 9:
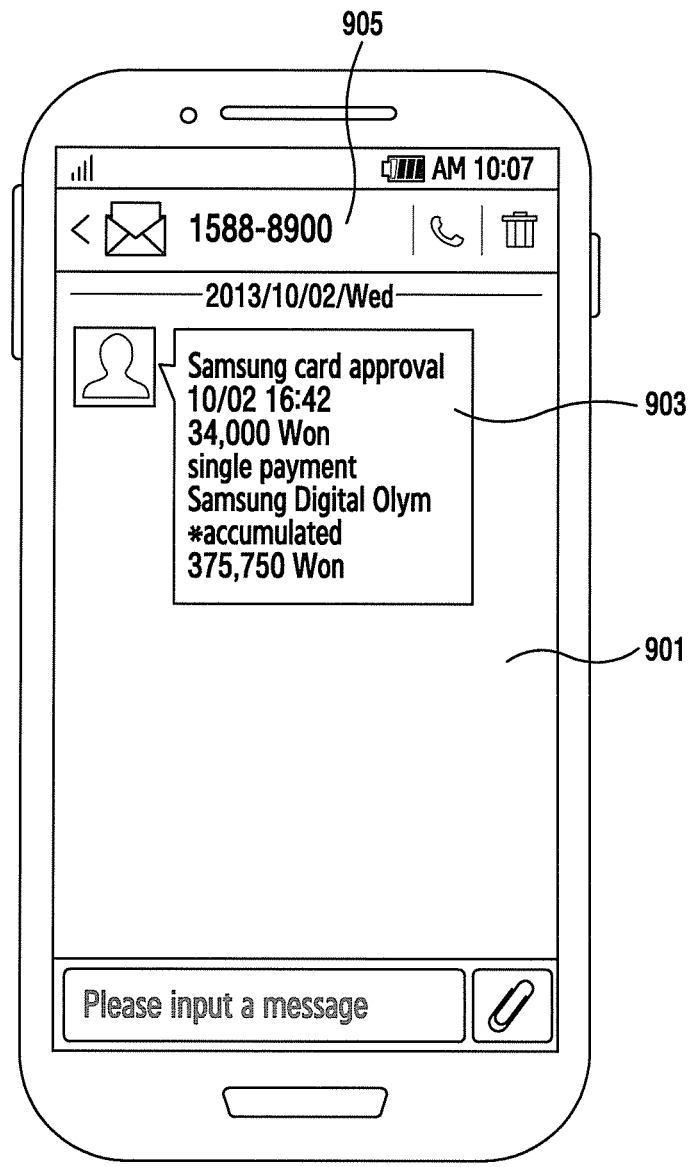
FIG. 9 illustrates a screen configuration for receiving financial settlement information in an electronic device according to various embodiments of the present disclosure.
Figure 10:
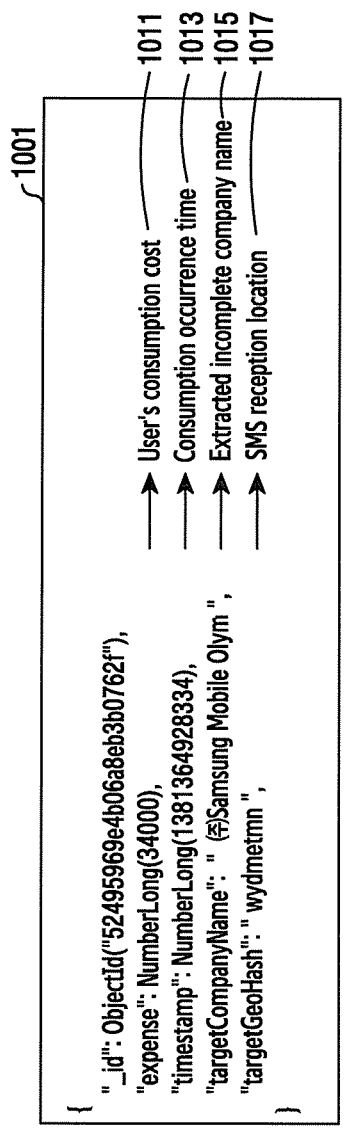
FIG. 10 illustrates a configuration for analyzing information of an event in an electronic device according to various embodiments of the present disclosure.

In operation 403, the electronic device may analyze the received financial settlement information. According to certain embodiments of the present disclosure, the electronic device may detect a company name (or a company or a name), an approval price, an approval time, and an SMS reception location from the received financial settlement information. For example, an electronic device 901 may receive financial settlement information 903 displayed as shown in FIG. 9. As shown in FIG. 10, the electronic device may detect a user's consumption cost 1011, a consumption occurrence time 1013, a consumption occurrence company name 1015, and an SMS reception location 1017 from the financial settlement information 903. In certain embodiments of the present disclosure, when the consumption occurrence company name included in the financial settlement information is acquired, the electronic device may acquire a complete (or perfect) company name or an incomplete company name on the basis of a received SMS. For example, the electronic device may receive a company name of 'Outback Olympic park branch' for which a card settlement is approved. The received SMS includes at least one part of 'Outback Olympic park branch', but may include an incomplete company name such as 'Outback Olym', and thus the electronic device may acquire the incomplete company name such as 'Outback Olym' by using the received SMS. According to the aforementioned description, although it is described under the assumption that the electronic device acquires the incomplete company name by using the received SMS, the present disclosure is not limited thereto, and thus it is also apparently possible to acquire a complete company name that can be fully indicated in the financial settlement information. The electronic device may determine whether the company name acquired from the financial settlement information 903 is a complete company name or an incomplete company name by using a database, a server, and/or the Internet. In addition, if it is determined that the company name acquired by using the SMS is the incomplete company name such as 'Outback Olym', the electronic device may acquire the complete company name such as 'Outback Olympic park branch' by using the database, the server, and/or the Internet.

Figure 14:
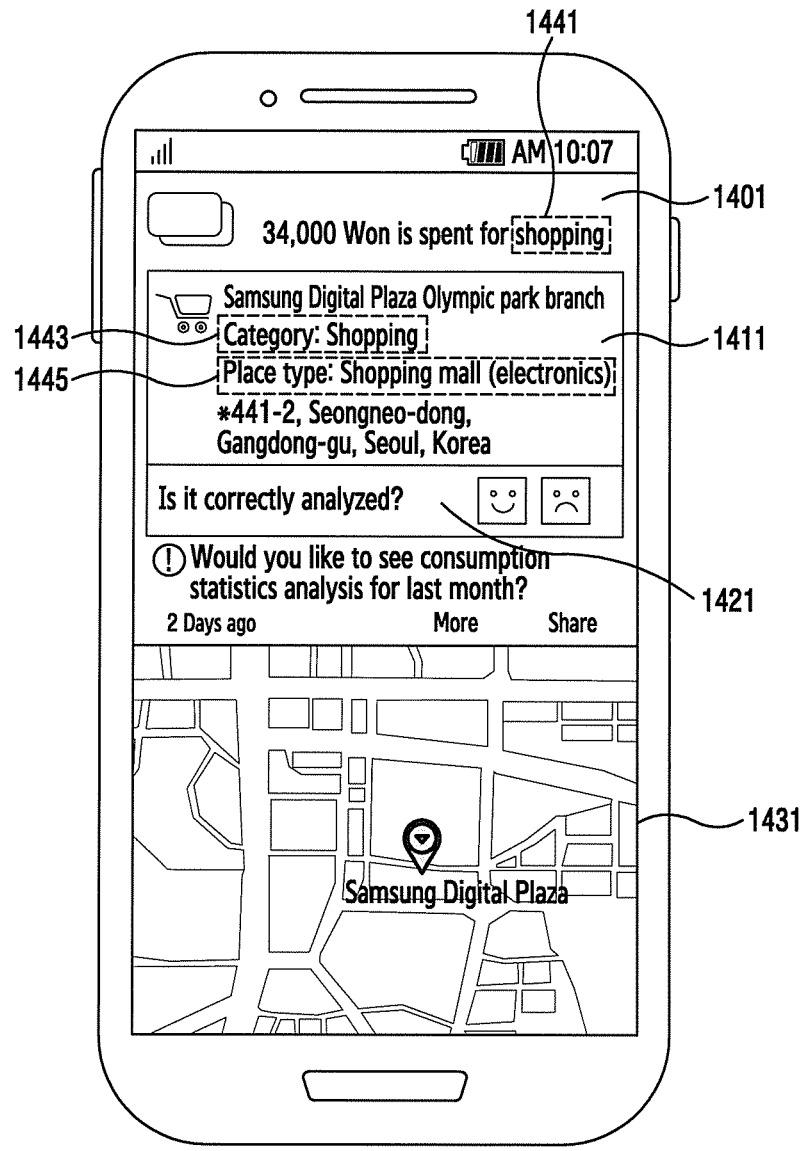
FIG. 14 illustrates a screen configuration for displaying POI information on an event in an electronic device according to various embodiments.

In operation 405, the electronic device may display Point of Interest (POI) information based on an analysis result of the financial settlement information. According to certain embodiments of the present disclosure, as shown in FIG. 10, the electronic device may determine the POI information based on the analysis result 1001 including the user's consumption cost 1011, consumption occurrence time 1013, incomplete company name 1015, and SMS reception location 1017 detected from the financial settlement information 903. According to certain embodiments of the present disclosure, as shown in FIG. 14, the electronic device may display at least one of settlement notification information 1401, detailed information 1411 (e.g., a company name, a category, a place type, and an address), and map 1431 regarding the financial settlement information.

According to certain embodiments of the present disclosure, the electronic device may acquire the POI information from a POI database stored in the electronic device based in part on the analysis result of the financial settlement information. For example, the electronic device may search the POI database applied to the electronic device on the basis of the company name acquired through the financial settlement information 903. Corresponding POI information may be acquired and displayed to the electronic device.

According to certain embodiments of the present disclosure, the electronic device may request the POI information by transmitting to the server the analysis result of the financial settlement information. The electronic device may display the analysis result of the financial settlement information and/or the POI information received from the server (e.g., may display this to the display 160).

Although it is described in the present specification that the event generated in the electronic device detects the financial settlement information, the event generated in the electronic device is not limited to the financial settlement, and thus may apparently be applied to various events. According to certain embodiments of the present disclosure, the event generated in the electronic device may relate to a financial task processed in a bank or a stock firm as described above. For example, the event generated in the electronic device may be related to a process of various tasks such as deposit/withdrawal, a wire transfer, a payment (e.g., tax payment), issuance (e.g., new account issuance, card issuance), closure (e.g., account closure), and settlement processed in a back at a specific location by using an SMS. In addition, the event generated in the electronic device may be related to a process of financial tasks such as stock trading, approval, and regular withdrawal processed in a stock firm or an insurance company at a specific location by using the SMS. By receiving information regarding a designated settlement matter (e.g., a financial transaction task) of a user such as the aforementioned approval of the card settlement and a task processed in a financial institute (e.g., a bank, a stock firm) (for example, by using a message), the electronic device may determine that the event has been generated, and may detect (or confirm) the information on the event on the basis of the received message.

In addition, although the event is described as the aforementioned approval of the card settlement and the task processed in the financial institute (e.g., the bank, the stock firm), the present disclosure is not limited thereto, and thus may apparently also apply to a settlement task in which a financial transaction is achieved, for example, in a shop for purchasing a product, a rental shop for lending a product, and a service industry for trading content.

In addition, the event is not limited to being generated by a user's behavior, and thus may apparently also apply to a settlement for using content such as media, images, and texts provided by the electronic device.

The description on the aforementioned event may apparently apply to the following description of the present specification. In addition, hereinafter, the aforementioned event may be used as a financial settlement, and information on the event (or information of the event) may be used as financial settlement information.

According to various embodiments of the present disclosure, the POI information requested by the electronic device may be POI information determined on the basis of the event, or may be POI determined on the basis of information on the event (or information of the event). In other words, if the financial settlement is described as an example of the event, the POI information determined on the basis of the event may be POI determined by information regarding the financial settlement generated in a place where the electronic device is located. In addition, the POI information determined on the basis of the information on the event may be POI information determined by financial settlement information received by the electronic device as to the generated event. In the following description, if an expression of the POI information on the event is used, it may indicate the POI information determined on the basis of the information on the event.

Figure 5:
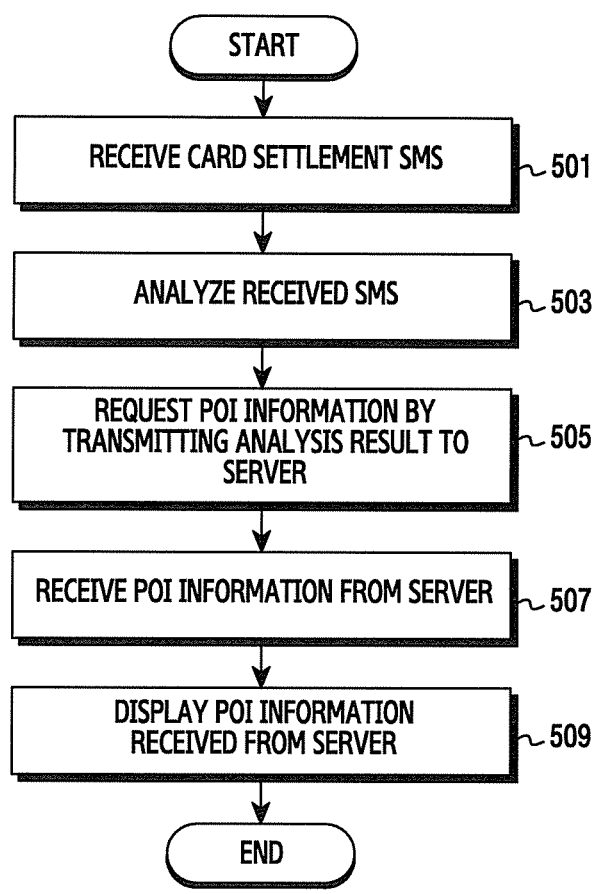
FIG. 5 illustrates a procedure for receiving POI information on an event in an electronic device from a server according to various embodiments of the present disclosure.

FIG. 5 illustrates a procedure for receiving POI information on an event in an electronic device from a server according to various embodiments of the present disclosure.

Referring to FIG. 5, in operation 501, the electronic device may receive financial settlement information. According to certain embodiments of the present disclosure, if an SMS is received, the electronic device may detect whether the received SMS includes a specific phone number (e.g., a phone number of a specific card company), and if the specific phone number is included, may confirm whether 'approval' is included in content of the SMS to detect the financial settlement information. Accordingly, the electronic device may detect the financial settlement information by filtering an advertisement, a wire transfer, an approval cancellation, other notifications, etc., received from the specific card company among SMSs to be received.

In operation 503, the electronic device may analyze the received financial settlement information. According to certain embodiments of the present disclosure, the electronic device may detect a company name, an approval price, an approval time, and an SMS reception location from the received financial settlement information. For example, if the electronic device 901 receives the financial settlement information 903 as shown in FIG. 9, the electronic device may detect the user's consumption cost 1011, the consumption occurrence time 1013, the incomplete company name 1015, and the SMS reception location 1017 from the financial settlement information 903 as shown in FIG. 10. Although it is assumed in the present embodiment that the company name included in the financial settlement information is an incomplete company name, the present disclosure is not limited thereto, and thus the company name may be a complete company name which can be fully indicated in the financial settlement information.

In operation 505, the electronic device may request POI information regarding the financial settlement information by transmitting to a server an analysis result of the financial settlement information. According to certain embodiments of the present disclosure, the electronic device may request the POI information by transmitting to the server the analysis result 1001 including the user's consumption cost 1011, consumption occurrence time 1013, incomplete company name 1015, and SMS reception location 1017 detected from the financial settlement information 903 as shown in FIG. 10.

In operation 507, the electronic device may receive the POI information regarding the financial settlement information from the server. According to certain embodiments of the present disclosure, an operation of the server for determining the POI information regarding the financial settlement information will be described with reference to FIG. 7 and FIG. 8.

In operation 509, the electronic device may display the POI information associated with the financial settlement information received from the server. According to certain embodiments of the present disclosure, if the POI information is received from the server, the electronic device may display the POI information as shown in FIG. 14. For example, the electronic device may display at least one of the settlement notification information 1401, detailed information 1411 (e.g., a company name, a category, a place type, and an address), and map 1431 regarding the financial settlement information.

Figure 6:
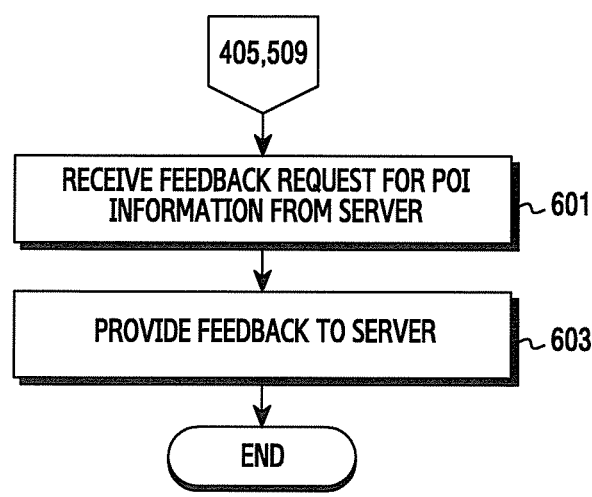
FIG. 6 illustrates a procedure for providing a feedback for POI information in an electronic device from a server according to various embodiments of the present disclosure.

FIG. 6 illustrates a procedure for providing a feedback for POI information in an electronic device from a server according to various embodiments of the present disclosure.

Referring to FIG. 6, in operation 601, the electronic device may receive a feedback request for the POI information from the server. According to certain embodiments of the present disclosure, the electronic device receives the POI information regarding the financial settlement information from the server in operation 405 of FIG. 4 and operation 509 of FIG. 5. Herein, the feedback request for the POI information may also be received together from the server. In this case, the electronic device may display at least one of the settlement notification information 1401, detailed information 1411 (e.g., the company name, the category, the place type, and the address), and map 1431 regarding the financial settlement information as shown in FIG. 14, and additionally may provide a feedback menu 1421 to confirm accuracy of the POI information.

According to certain embodiments of the present disclosure, the electronic device may determine whether the POI information is accurate based in part on a user's selection regarding the feedback menu 1421.

Figure 15:
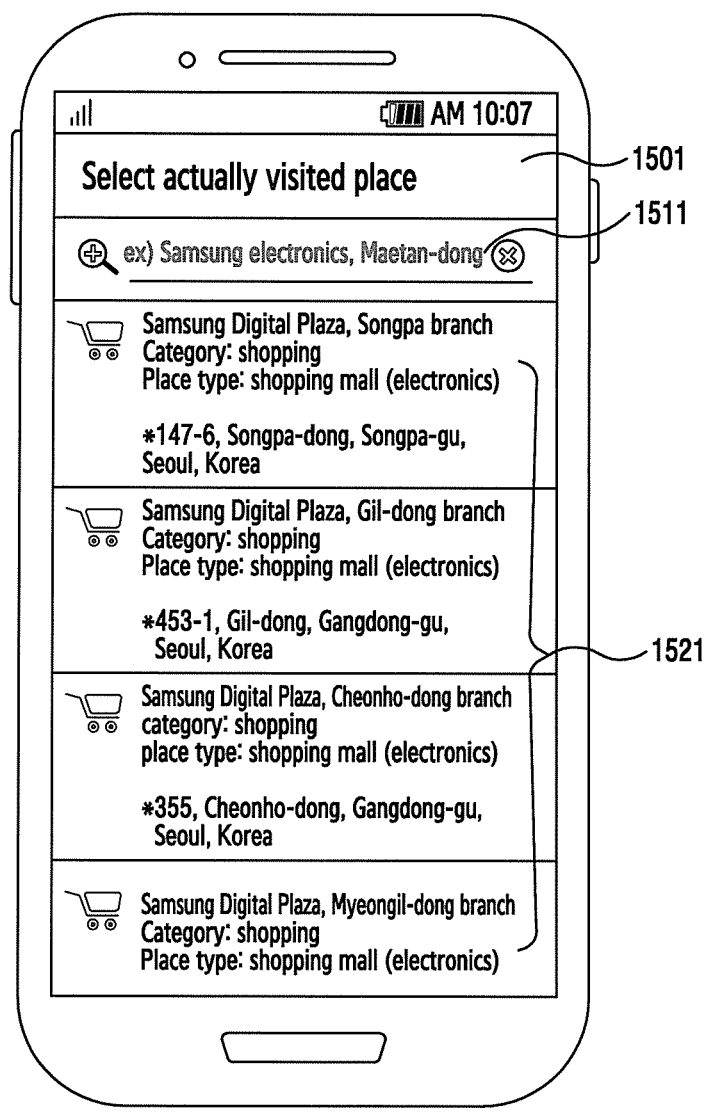
FIG. 15 illustrates a screen configuration for modifying POI information on an event in an electronic device according to various embodiments of the present disclosure.

According to certain embodiments of the present disclosure, if an user selects a button representing that the information is not accurate on the feedback menu 1421, as shown in FIG. 15, the electronic device may provide a menu 1501 capable of allowing a user to select an actually visited place. In this case, a corresponding place may be retrieved from the menu 1501 capable of allowing a user to select the actually visited place, and any one place may be selected from a search result 1521. In this case, the electronic device may change at least one piece of information among a plurality of pieces of information provided in FIG. 14 based in part on any one place selected from the search result 1521.

In operation 603, the electronic device may provide a feedback for a feedback request of the server. According to certain embodiments of the present disclosure, as shown in FIG. 14, the electronic device may transmit feedback information determined according to a user's selection regarding the feedback menu 1421 (e.g., whether POI information is accurate) to the server.

According to certain embodiments of the present disclosure, if an user selects a button representing that the information is not accurate on the feedback menu 1421, as shown in FIG. 15, the electronic device may provide a menu 1501 capable of allowing a user to select an actually visited place. In this case, a corresponding place may be retrieved from the menu 1501 capable of allowing a user to select the actually visited place, and any one place may be selected from a search result 1521. In this case, the electronic device may transmit feedback information including any one place selected from the search result 1521 to the server.

Figure 7:
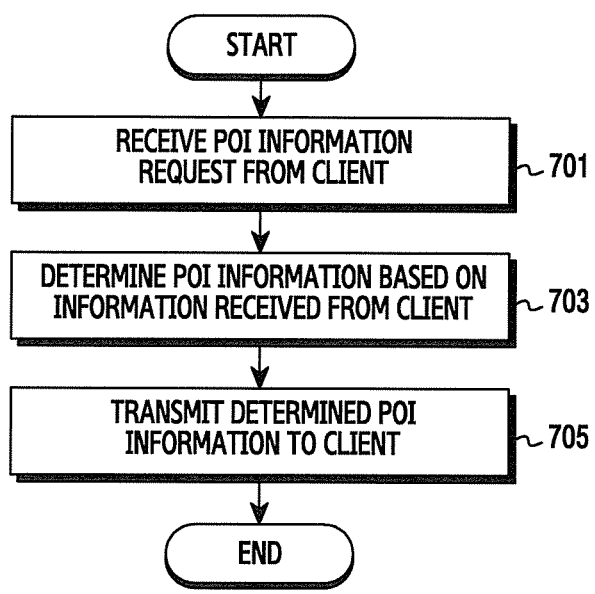
FIG. 7 illustrates a procedure for providing POI information on an event from a server to a client according to various embodiments of the present disclosure.

FIG. 7 illustrates a procedure for providing POI information on an event from a server to a client according to various embodiments of the present disclosure.

Referring to FIG. 7, in operation 701, the server may receive a POI information request from the client. According to certain embodiments of the present disclosure, as shown in FIG. 10, the server may receive from the electronic device the POI information request based on the analysis result 1001 including the consumption cost 1011, consumption occurrence time 1013, incomplete company name 1015, and SMS reception location 1017 detected from the financial settlement information 903.

Figure 12:
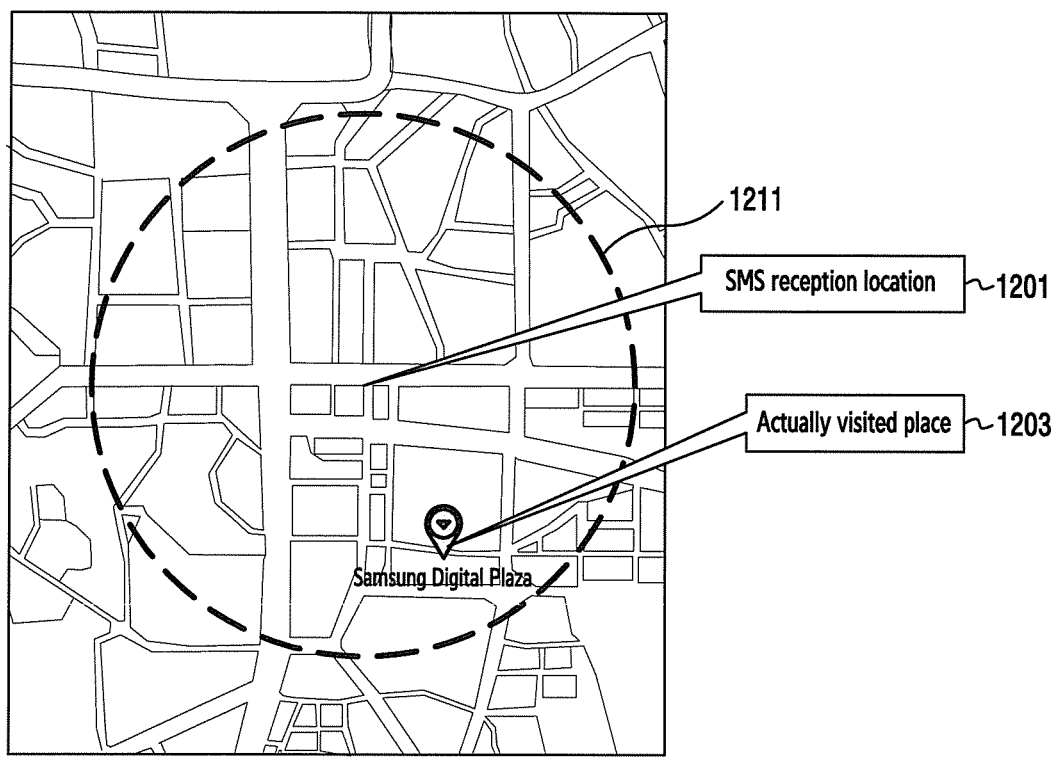
FIG. 12 illustrates a configuration of a location at which information of an event is received and an actually visited place in an electronic device according to various embodiments of the present disclosure.

In operation 703, the server may determine the POI information on the basis of information received from the client. According to certain embodiments of the present disclosure, as shown in FIG. 12, the server may confirm whether there is a company name similar to an incomplete company name received from the electronic device within a reference range (e.g., within a distance of a radius N from the SMS reception location) based in part on the SMS reception location 1201 received from the electronic device. For example, if the incomplete company name received from the electronic device is "Samsung Digital Olym", the server may detect a company name including "Samsung Digital Olym" within the reference range at the SMS reception location. If a plurality of company names are detected, the electronic device may determine a company name corresponding to a location close to the SMS reception location as a company name of an actually visited place 1203.

Figure 11:
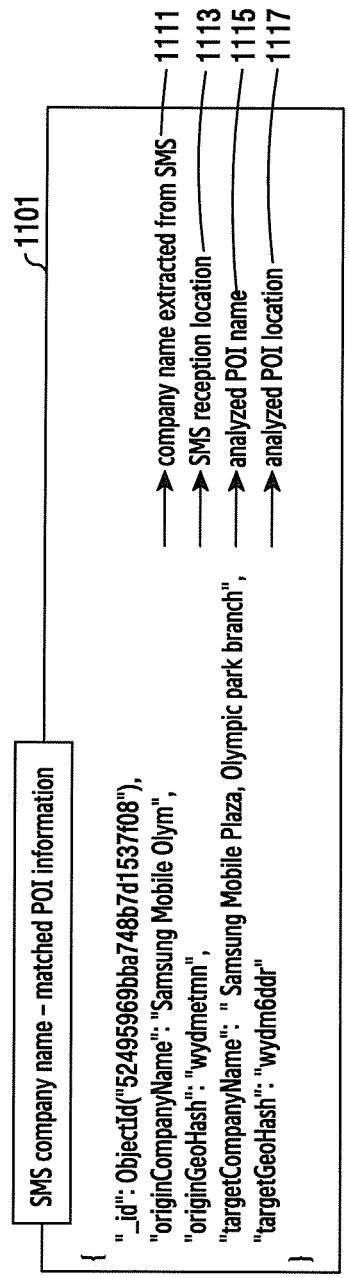
FIG. 11 illustrates a configuration of POI information based on an information analysis of an event in an electronic device according to various embodiments of the present disclosure.

Accordingly, as shown in FIG. 11, the server may determine a POI company name 1115 and a POI location 1117 by using a company name 1111 and SMS reception location 1113 received from the electronic device. According to certain embodiments of the present disclosure, the server may refer to a database to determine the POI company name 1115 and the POI location 1117 which are matched to the received company name 1111 and SMS reception location 1113. When determining the POI company name 1115 and the POI location 1117, the server may determine them by referring to the feedback received from the electronic device. For example, the server may determine that the POI company name 1115 and POI location 1117 determined in association with the company name 1111 and SMS reception location 1113 are incorrect information on the basis of the user feedback. The server may receive the user feedback, and thus may modify the POI company name 1115 and the POI location 1117 corresponding to the company name 1111 and SMS reception location 1113. If the POI information request is received on the basis of the company name 1111 and the SMS reception location 1113, the server may determine the POI company name 1115 and the POI location 1117 on the basis of a modified database.

Figure 13:
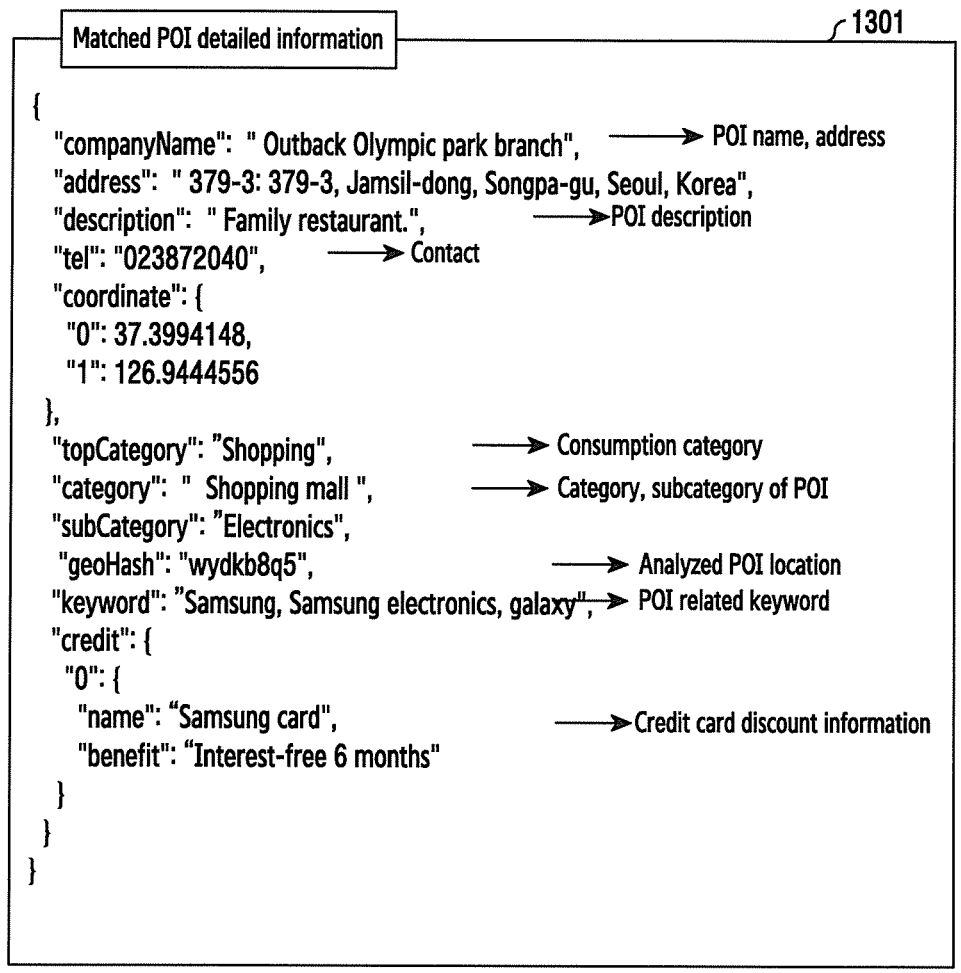
FIG. 13 illustrates a configuration of POI information based on an information analysis of an event in an electronic device according to various embodiments of the present disclosure.

In addition, as shown in FIG. 13, the server may determine POI detailed information 1301 including the POI company name and POI location determined by using the company name and SMS reception location received from the electronic device.

In operation 705, the server may transmit the determined POI information to the client. According to certain embodiments of the present disclosure, the server may transmit the POI information and/or POI detailed information determined in operation 703 to the electronic device.

Figure 8:
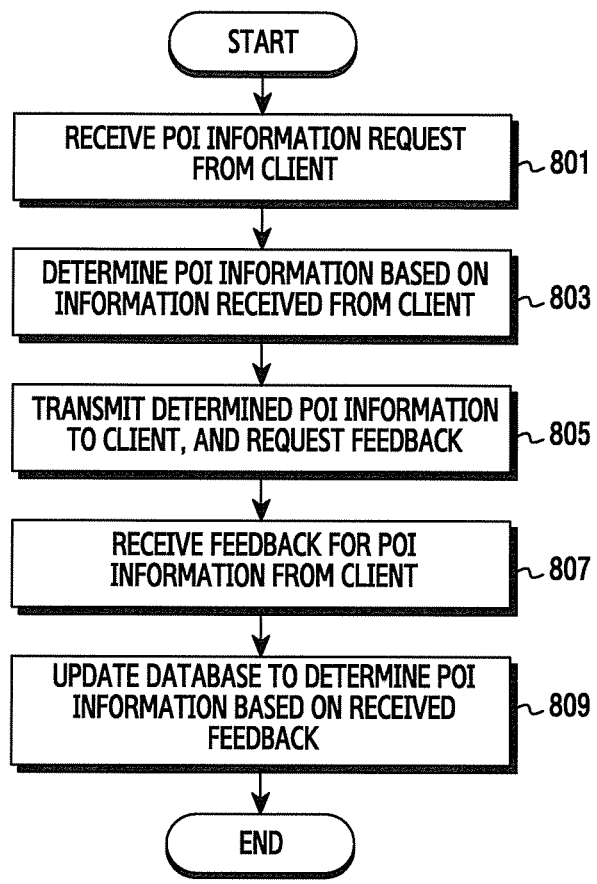
FIG. 8 illustrates a procedure for receiving a feedback for POI information on an event provided from a server to a client according to various embodiments of the present disclosure.

FIG. 8 illustrates a procedure for receiving a feedback for POI information on an event provided from a server to a client according to various embodiments of the present disclosure.

Referring to FIG. 8, in operation 801, the server may receive a POI information request from the client. According to certain embodiments of the present disclosure, as shown in FIG. 10, the server may receive from the electronic device the POI information request based on the analysis result 1001 including the consumption cost 1011, consumption occurrence time 1013, incomplete company name 1015, and SMS reception location 1017 detected from the financial settlement information 903.

In operation 803, the server may determine the POI information on the basis of information received from the client. According to certain embodiments of the present disclosure, as shown in FIG. 12, the server may confirm whether there is a company name similar to an incomplete company name received from the electronic device within a reference range (e.g., within a distance of a radius N from the SMS reception location) on the basis of the SMS reception location 1201 received from the electronic device. For example, if the incomplete company name received from the electronic device is "Samsung Digital Olym", the server may detect a company name including "Samsung Digital Olym" within the reference range at the SMS reception location. If a plurality of company names are detected, the electronic device may determine a company name corresponding to a location close to the SMS reception location as a company name of the actually visited place 1203.

Accordingly, as shown in FIG. 11, the server may determine the POI company name 1115 and the POI location 1117 by using the company name 1111 and SMS reception location 1113 received from the electronic device.

In addition, as shown in FIG. 13, the server may determine the POI detailed information 1301 including the POI company name 1115 and POI location 1117 determined by using the company name 1111 and SMS reception location 1113 received from the electronic device.

In operation 805, the server may transmit the determined POI information to the client, and may request a feedback for the POI information. According to certain embodiments of the present disclosure, the server may transmit the POI information determined in operation 803 to the electronic device. In this case, the server may request a feedback for confirming whether the POI information provided to the electronic device is accurate. According to certain embodiments of the present disclosure, when requesting the feedback for confirming whether the POI information is accurate, the server may request a feedback regarding whether the provided POI information is correct or incorrect, and/or if the provided POI information is incorrect (or wrong) information, may request modified POI information on the basis of a user input.

In operation 807, the server may receive the feedback for the POI information from the client. According to certain embodiments of the present disclosure, whether the POI information is accurate may be provided from the electronic device to the server. According certain embodiments of the present disclosure, if it is provided from the electronic device that the POI information is inaccurate, updated information regarding the POI information may be provided to the server.

In operation 809, the server may update a database to determine the POI information on the basis of the received feedback. According to certain embodiments of the present disclosure, if it is provided from the electronic device that the POI information is incorrect, updated information (or modified information) regarding the POI information may be provided to the server. The server may modify the POI information of the database by referring to the feedback received from the client. The server may determine the POI information modified on the basis of the feedback when determining the POI information by using information received from the client at a later time (e.g., analysis information received in operation 801).

According to various embodiments of the present disclosure, when the database is modified on the basis of the feedback, the server may transmit modified information (e.g., analysis information received in operation 801 and/or POI information corresponding to the analysis information) to the client. When transmitting the modified information to the client, the server may transmit a notification regarding the modification of the database to the client without a request of the client.

FIG. 9 illustrates a screen configuration for receiving financial settlement information in an electronic device according to various embodiments of the present disclosure.

According to various embodiments of the present disclosure, the electronic device may receive an SMS 901 for a financial settlement performed by a user. According to certain embodiments of the present disclosure, the SMS received by the electronic device may include a representative number 905 of a service provider (e.g., a provider providing process information regarding the financial settlement) and content 903 regarding the financial settlement. For example, the content 903 regarding the financial settlement may include information such as a company name for which the financial settlement is approved, an approval price, and an approval time. When receiving the SMS, the electronic device may acquire a location at which the SMS is received (i.e., an SMS reception location). When acquiring the location at which the SMS is received, the electronic device may acquire it by referring to a header of the SMS, may acquire it through at least one location determining sensor (e.g., a GPS) included in the electronic device, and may acquire it by receiving device information from a base station from which the SMS is transmitted.

FIG. 10 illustrates a configuration for analyzing information of an event in an electronic device according to various embodiments of the present disclosure.

According to various embodiments of the present disclosure, the electronic device may acquire information such as a company name 1015 for which the financial settlement is approved, an approval price 1011, an approval time 1013, and an SMS reception location 1017 by analyzing content of received financial settlement information (e.g., a received SMS). Although the financial settlement information (e.g., the received SMS) to be analyzed by the electronic device may be XML-type data or HTML-type data as shown in FIG. 10, the present disclosure is not limited thereto, and thus the information may be configured by using various types of protocols.

FIG. 11 illustrates a configuration of POI information 1101 based on an information analysis of an event in an electronic device according to various embodiments of the present disclosure.

According to various embodiments of the present disclosure, the electronic device may transmit analysis information acquired by analyzing received financial information to a server, and thus may request the POI information. The electronic device may receive the POI information from the server, and may provide the POI information to a user (e.g., may display it to the display 160). According to certain embodiments of the present disclosure, as shown in FIG. 11, the POI information received by the electronic device may include information such as a company name 1111 included in the analysis information, a POI company name 1115 determined on the basis of the analysis information, a location 1113 at which an SMS included in the analysis information is received, and a POI location 1117 determined on the basis of the analysis information. Herein, the location 1113 at which the SMS included in the analysis information is received may be obtained by allowing received financial settlement information (e.g., SMS) to include location information acquired at a time at which the electronic device receives financial settlement information.

FIG. 12 illustrates a configuration of a location at which information of an event is received and an actually visited place in an electronic device according to various embodiments of the present disclosure.

According to various embodiments of the present disclosure, the electronic device may provide POI location information determined in a server to a user on the basis of location information of a time point at which financial settlement information is received and location information of a time point at which the financial settlement information is received. According to certain embodiments of the present disclosure, the electronic device may acquire a company name through the received financial settlement information, and may acquire information of a location 1201 of a time point at which the financial settlement information is received. The electronic device may acquire information of a POI location (e.g., an actually visited place) 1203 from the server on the basis of the acquired company name and/or the location 1201 of the time point at which the financial settlement information is received. The electronic device may provide the POI information 1203 received from the server. When the electronic device displays information of at least one of the location corresponding to the company name and the location 1201 at which the financial settlement information is received, the information may be displayed through the display 160 of the electronic device. According to certain embodiments of the present disclosure, the electronic device may display information of at least one location through a designated program (e.g., a map program). On the basis of a user input, the electronic device may determine that POI information provided to a map is incorrect information, and may acquire a feedback input from a user. The electronic device may modify the POI information and/or a database on the basis of the acquired user feedback, and may transmit the acquired feedback information to the server.

FIG. 13 illustrates a configuration of POI information based on an information analysis of an event in an electronic device according to various embodiments of the present disclosure.

According to various embodiments of the present disclosure, the POI information may include information such as a POI name (or a POI company name) determined on the basis of a company name included in received analysis information, a POI description, a contact (e.g., a phone number designated to a company name of a corresponding location), a consumption category, a category designated to POI, a POI location, a POI related keyword (e.g., an index), and discount information. The electronic device may transmit to a server the analysis information acquired on the basis of received financial settlement information, and may receive POI information including at least one of the aforementioned information from the server.

FIG. 14 illustrates a screen configuration for displaying POI information on an event in an electronic device according to various embodiments of the present disclosure.

The electronic device may provide received POI information to a user. According to certain embodiments of the present disclosure, the electronic device may display an interface configured on the basis of the received POI information to the display 160. For example, the electronic device may display at least one of the settlement notification information 1401, detailed information 1411 (e.g., a company name, a category 1443, a place type 1445, and an address), and map 1431 regarding financial settlement information on the basis of the received POI information. When displaying the settlement notification information 1401, the electronic device may display a consumption type 1441 (e.g., a shopping) determined in accordance with the received financial settlement information. When determining the consumption type on the basis of the financial settlement information, the electronic device may classify this into eating, shopping, medicine, education, health/beauty treatment, entertainment, transportation/travel, and the like, and may determine at least one consumption type on the basis of analysis information such as the company name, phone number, and location acquired on the basis of the financial settlement information. The electronic device may include at least one or more pieces of POI information, and may generate statistical data on the basis of the consumption type determined in association with each piece of POI information. The electronic device may display the generated statistical data to the display 160 on the basis of a user input.

FIG. 15 illustrates a screen configuration for modifying POI information on an event in an electronic device according to various embodiments of the present disclosure.

According to various embodiments of the present disclosure, the electronic device may acquire analysis information such as a company name corresponding to a location at which a financial settlement is achieved on the basis of received financial settlement information, a phone number and location corresponding to the company name, or the like. The electronic device may determine POI information by using analysis information and a database stored in the electronic device. The electronic device may determine a POI company name for which the financial settlement is to be approved and which is to be included the POI information by using at least one piece of the analysis information (e.g., a company name, a phone number, location information). If the POI company name corresponding to the analysis information cannot be determined, the electronic device may determine at least one piece of POI information similar to the analysis information around a location (e.g., within a designated radius, within a reference distance radius) determined on the basis of the analysis information. The electronic device may display the determined POI information to the display 160 to provide a menu 1501 so that a user is allowed to select POI information by which the financial settlement is achieved. The electronic device may determine POI information selected from at least one piece of displayed POI information 1521 as POI information corresponding to analysis information.

According to various embodiments of the present disclosure, the electronic device may transmit the analysis information to the server, and may receive from the server the POI information determined on the basis of the analysis information. Herein, when the electronic device transmits the POI information determined on the basis of the received analysis information, the server may request the electronic device to transmit a feedback regarding whether the determined POI information is accurate information. In addition, if the POI information matched to the analysis information cannot be determined, the server may determine at least one piece of POI information 1521 determined to be similar around a location (e.g., within a designated radius) determined on the basis of the analysis information, and may request the electronic device to perform transmission/feedback so that a company name matched to the analysis information (or by which the financial settlement is achieved) is selected. The electronic device may display to the display 160 at least one piece of POI information 1521 received from the server, and may determine the POI information by which the financial settlement is achieved on the basis of a user input. The server may modify the POI information corresponding to the analysis information on the basis of the feedback received from the electronic device. The server may store the modified POI information into a database. The electronic device may transmit the feedback to the server by including the selected POI information. If the analysis information is transmitted to the server to request the POI information, the electronic device may receive from the server the POI information determined on the basis of the modified database.

FIG. 16 illustrates a screen configuration for modifying a consumption type on the basis of financial settlement information in an electronic device according to various embodiments of the present disclosure.

According to various embodiments of the present disclosure, the electronic device may acquire analysis information such as a company name for which a financial settlement is achieved, an approval time, an address corresponding to the company name, and a phone number corresponding to the company name on the basis of received financial settlement information. The electronic device may determine the POI information on the basis of the acquired analysis information, and may receive the POI information determined on the basis of the analysis information from the server. The electronic device may use the POI information corresponding to at least one piece of financial settlement information so that it is used to determine a user's consumption type and/or statistical information.

Referring to FIG. 16A, the electronic device may classify a user's consumption type on the basis of financial settlement information processed in a corresponding month according to at least one piece of POI information, and may provide statistical information on the basis of the determined consumption type. According to certain embodiments of the present disclosure, the electronic device may determine the consumption type on the basis of the financial settlement information and/or information such as a company name, phone number, address, or the like included in the POI information. For example, the consumption type may be variously classified into eating, shopping, medicine, education, health/beauty treatment, entertainment, transportation/travel, and the like, and each consumption type may include at least one category. For example, the consumption type corresponding to the education may be configured by including at least one of categories such as a university, a private educational institute, a library, a daycare center, a language school, an entrance examination, and a home-study material. When the electronic device displays the financial settlement information processed in a corresponding month in various consumption types, it may be displayed in a form of a ratio (e.g., a percentage) depending on each consumption type or may be displayed in a form of the number of times thereof. The electronic device may display the consumption type in a form of a group (e.g., a pie graph, a bar graph).

According to various embodiments of the present disclosure, when the electronic device provides the received financial settlement information and/or POI information to the user, a consumption rank per category may be displayed as shown in FIG. 16B, a maximum consumption place (or a consumption type) per case during recent one month may be displayed as shown in FIG. 16C, and a consumption statistics per region in which the financial settlement information is processed may be displayed as shown in FIG. 16D. Without being limited to the aforementioned description, it is apparent that the electronic device can provide various statistical data that can be determined on the basis of the financial settlement information and/or the POI information. In addition, as shown in FIG. 16E, the electronic device may provide financial settlement information 1601 used at a specific location on the basis of configuration information.

According to various embodiments of the present disclosure, an electronic device may provide a user's preference consumption type on the basis of statistics acquired as described above. The electronic device may provide input user information and a consumption trend (e.g., market information, preference) on the basis of the acquired statistics.

According to various embodiments of the present disclosure, a server may confirm various user consumption trends (e.g., market information, preference) on the basis of analysis information acquired from at least two electronic devices and/or POI determined on the basis of the analysis information.

According to various embodiments of the present disclosure, a method of providing POI information in an electronic device may include detecting financial settlement information, analyzing a text included in the financial settlement information and a location at which the information is received, and displaying POI information based on a result of the analysis.

According to various embodiments of the present disclosure, the method may include, upon receiving an SMS, confirming whether the received SMS includes a pre-defined card company's name or phone number, and if the received SMS includes the pre-defined card company's name or phone number, analyzing the text included in the received SMS and the location at which the information is received.

According to various embodiments of the present disclosure, the method may further include confirming a location at which the financial settlement information is received through a Global Positioning System (GPS) sensor or a network.

According to various embodiments of the present disclosure, the method may further include extracting a company name from the text included in the financial settlement information, and detecting a company name similar to the company name corresponding to a location within a radius of a reference distance on the basis of a location at which the financial settlement information is received.

According to various embodiments of the present disclosure, the method may further include analyzing the text included in the financial settlement information and a reception location, and thus requesting an external electronic device to transmit the POI information based on a result of the analysis.

According to various embodiments of the present disclosure, the method may further include receiving the POI information based on the result of the analysis from the external electronic device, and displaying the received POI information.

According to various embodiments of the present disclosure, the method may further include receiving a feedback request for the POI information from an external electronic device, displaying a user interface for responding to the feedback request for the POI information, and transmitting to the external electronic device a feedback for the POI information based on a user's selection for the user interface.

According to various embodiments of the present disclosure, the method may further include receiving a POI information request for financial settlement information from an external electronic device, determining POI information based on information received from the external electronic device, and transmitting the determined POI information to the external electronic device.

According to various embodiments of the present disclosure, the method may further include extracting a location at which the financial settlement information is received and a company name included in the financial settlement information from the information received from the external electronic device, and determining a company name similar to the company name corresponding to a location within a reference radius as the POI information of the financial settlement information on the basis of the location at which the financial settlement information is received.

According to various embodiments of the present disclosure, the method may further include, if the similar company name exists in the plural, determining a company name corresponding to a location closest in distance to a location at which the financial settlement information is received as the POI information of the financial settlement information.

According to various embodiments of the present disclosure, the method may further include requesting a feedback for the POI information transmitted to the external electronic device, and receiving the feedback for the POI information from the external electronic device.

The term "module", as used herein, refers to a unit including one of hardware, software, and firmware, or a combination of two or more of them, for example. For example, the term "module" may be used interchangeably with terms like "unit", "logic", "logical block", "component", or "circuit". A module may be a minimum unit of an integrally configured part or a part of it. A module may be a minimum unit that performs one or more functions or a part of it. A module may be implemented mechanically or electronically. For example, a module may include at least one of an Application Specific Integrated Circuit (ASIC) chip, Field Programmable Gate Arrays (FPGAs), and a programmable logic device.

At least part of the apparatus (for example, modules or functions) or method (for example, operations), according to various embodiments, may be implemented by using instructions stored in a computer-readable storage media in the form of a programming module. When the instructions are executed by one or more processors (for example, the processor 120), the one or more processors may perform a function corresponding to the instructions. The computer-readable storage media may be the memory 130, for example.

Examples of the computer-readable recording medium include hard disks, floppy disks, magnetic media (for example, magnetic tapes), optical media (for example, Compact Disc Read Only Memories (CD-ROMs), Digital Versatile Disc (DVDs), magneto-optical media (for example, floptical disks)), and hardware devices (for example, Read Only Memories (ROMs), Random Access Memories (RAMs) and flash memories). Examples of the program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or programming module, according to various embodiments, may include one or more of the above-described elements, may omit some elements, or may further include additional elements. The operations performed by the module, the programming module, or the other elements, according to various embodiments, may be performed serially, in parallel, repeatedly, or heuristically. In addition, some operation may be performed in different order or may be omitted, and additional other operations may be added.

According to various embodiments, a computer-readable recording medium storing instructions may be a computer-readable recording medium in which a program for executing operations is recorded. The operation may include receiving a wireless signal, identifying an activation or deactivation of a service corresponding to the received wireless signal, and outputting contents related to the service based on the activation or deactivation of the service.

According to various embodiments, an electronic device may selectively receive service related contents in consideration of a capability of a user or a state of the user.

While the disclosure has been shown and described with reference to certain embodiments thereof, it will be understood by those skilled in the art that various changes in form and detail may be made therein without departing from the spirit and scope of the disclosure as defined by the appended claims.

According to various embodiments of the present disclosure, a computer-readable storage medium may store instructions of a program for executing operations of detecting financial settlement information, analyzing a text included in the financial settlement information and a reception location, and controlling the display to display POI information based on a result of the analysis.

Although the present disclosure has been described with embodiments, various changes and modifications may be suggested to one skilled in the art. It is intended that the present disclosure encompass such changes and modifications as fall within the scope of the appended claims.

What is claimed is:

1. An electronic device comprising:
 a communication interface;
 a display; and
 a processor configured to:
  receive information on an event via the communication interface, wherein the event includes a financial settlement,
  analyze a text included in the information on the event and a location at which the electronic device receives the information on the event via the communication interface, and
  control the display to display Point Of Interest (POI) information based in part on a result of the analysis,
  wherein the POI information includes detailed information of the financial settlement and information on a place associated with a location at which the financial settlement occurs.

2. The electronic device of claim 1, wherein the information on the place further includes information on a map on which a location of the place is displayed.

3. The electronic device of claim 1, wherein the processor is further configured to receive the information on the event by using at least one of a Short Message Service (SMS), a Long Message Service (LMS), or a Multi Message Service (MMS).

4. The electronic device of claim 1, wherein the processor is further configured to:
 identify whether the information on the event comprises a company name or a phone number of a pre-defined settlement approval place, and
 perform a search for the POI information by using the company name or the phone number.

5. The electronic device of claim 1, wherein the processor is further configured to identify the location at which the electronic device receives the information on the event using a Global Positioning System (GPS) sensor or a network.

6. The electronic device of claim 1, wherein the processor is further configured to:
 extract a company name from the text included in the information on the event, and
 detect a second company name similar to the extracted company name,
 wherein a place corresponding to the detected second company name is located within a radius of a reference distance on a basis of the location at which the information on the event is received.

7. The electronic device of claim 1, wherein the processor is further configured to:
 analyze the text included in the information on the event and the location at which the electronic device receives the information on the event, and
 request the POI information from an external electronic device based in part on the result of the analysis.

8. The electronic device of claim 7, wherein the processor is further configured to:
 receive, via the communication interface, the POI information from an external electronic device, and
 control the display to display the POI information.

9. The electronic device of claim 1, wherein the processor is further configured to:
 receive, via the communication interface, a feedback request for the POI information from an external electronic device,
 control the display to display a user interface for responding to the feedback request for the POI information, and
 transmit, to the external electronic device via the communication interface, feedback for the POI information based in part on a user selection for the user interface.

10. An electronic device comprising:
 a communication interface; and a hardware processor configured to:
   receive, via the communication interface, a POI information request for an event from an external electronic device, wherein the event includes a financial settlement, the POI information request includes information on a location and a text, the location being as a location at which the external electronic device has received information on the event via the communication interface, and the text being included in the information on the event,
   determine a POI information based in part on information on the event, the information on the event received from the external electronic device, and
   transmit, via the communication interface, the determined POI information to the external electronic device,
   wherein the POI information includes detailed information of the financial settlement and information on a place associated with a location at which the financial settlement occurs.

11. The electronic device of claim 10, wherein the hardware processor is further configured to:
   extract, from the POI information request, the location at which the external electronic device has received the information on the event and a company name included in the information on the event, and
   determine a second company name similar to the company name,
   wherein a place corresponding to the determined second company name is located within a reference radius as the POI information of the event on a basis of the location at which the external electronic device has received the information on the event.

12. The electronic device of claim 11, wherein the hardware processor is further configured to, if a plurality of places correspond to the determined second company name, determine a third company name corresponding to a place closest in distance to the location at which the external electronic device has received the information on the event as the POI information of the event.

13. The electronic device of claim 10, wherein the hardware processor is further configured to send, via the communication interface, a request for feedback for the POI information transmitted to the external electronic device, and receive the feedback for the POI information from the external electronic device.

14. The electronic device of claim 13, wherein the hardware processor is further configured to: upon receipt of the POI information request for the event, modify the POI information based in part on the received feedback, and transmit modified POI information to the external electronic device.

15. A method of operating an electronic device for providing Point Of Interest (POI) information, the method comprising:
   receiving, via a communication interface, information on an event, wherein the event includes a financial settlement;
   analyzing a text included in the information on the event and a location at which the electronic device receives the information on the event via the communication interface; and
   controlling a display to display the POI information based in part on a result of the analysis,
   wherein the POI information includes detailed information of the financial settlement and information on a place associated with a location at which the financial settlement occurs.

16. The method of claim 15, wherein the information on the event is financial settlement information.

17. The method of claim 15, wherein the information on the event uses at least one of a Short Message Service (SMS), a Long Message Service (LMS), and a Multi Message Service (MMS).

18. The method of claim 15, wherein analyzing the text included in the information on the event and the location at which the electronic device receives the information on the event comprises:
   receiving the information on the event through a message;
   identifying whether the received message comprises a company name or a phone number of a pre-defined settlement approval place; and
   searching for the POI information by using the company name or the phone number.

19. The method of claim 15, further comprising identifying the location at which the electronic device receives the information on the event using a Global Positioning System (GPS) sensor or a network.

20. The method of claim 15, further comprising:
   extracting a company name from the text included in the information on the event; and
   detecting a second company name similar to the company name,
   wherein a place corresponding to the detected second company name is located within a radius of a reference distance on a basis of the location at which the information on the event is received.

21. The method of claim 15, further comprising:
   analyzing the text included in the information on the event and the location at which the electronic device receives the information on the event; and
   requesting an external electronic device to transmit the POI information based in part on the result of the analysis.

22. The method of claim 21, further comprising:
   receiving the POI information from the external electronic device; and
   displaying the received POI information.

23. The method of claim 15, further comprising:
   receiving a feedback request for the POI information from an external electronic device;
   displaying a user interface for responding to the feedback request for the POI information; and
   transmitting, to the external electronic device, feedback for the POI information based in part on a user selection for the user interface.

24. A method of operating an electronic device for providing POI information, the method comprising:
   receiving, via a communication interface, a POI information request for an event from an external electronic device, wherein the event includes a financial settlement, the POI information request includes information on a location and a text, the location being as a location at which the external electronic device has received information on the event via the communication interface, and the text being included in the information on the event;
   determining POI information based in part on information on the event, the information on the event received from the external electronic device; and transmitting the determined POI information to the external electronic device,
wherein the POI information includes detailed information of the financial settlement and information on a place associated with a location at which the financial settlement occurs.

25. The method of claim 24, further comprising:
extracting, from the POI information request, the location at which the external electronic device has received the information on the event and a company name included in the information on the event; and
determining a second company name similar to the company name,
wherein a place corresponding to the determined second company name is located within a reference radius as the POI information of the event on a basis of the location at which the external electronic device has received the information on the event.

26. The method of claim 25, further comprising, if a plurality of places are corresponding to the determined company name exists, determining a third company name corresponding to a place closest in distance to a location at which the information on the event is received as the POI information of the event.

27. The method of claim 24, further comprising:
requesting feedback for the POI information transmitted to the external electronic device; and
receiving the feedback for the POI information from the external electronic device.

28. The method of claim 27, further comprising, upon receiving a POI information request corresponding to the event or the information regarding the event, modifying the POI information based in part on the received feedback.

29. The method of claim 28, further comprising transmitting the modified POI information to the external electronic device.

30. A non-transitory computer-readable storage medium storing instructions of a program for executing operations that, when executed by a processor, cause the processor to perform the operations of:
receiving, via a communication interface, information on an event, wherein the event includes a financial settlement;
analyzing a text included in the information on the event and a location at which the information on the event is received via the communication interface; and
controlling a display to display Point Of Interest (POI) information based in part on a result of the analysis,
wherein the POI information includes detailed information of the financial settlement and information on a place associated with a location at which the financial settlement occurs.

* * * * *